United States Patent [19]
Handa et al.

[11] Patent Number: 5,562,353
[45] Date of Patent: Oct. 8, 1996

[54] TAPE PRINTING APPARATUS THAT CALCULATES CHARACTER SIZES AND LINE LENGTHS

[75] Inventors: Yuji Handa, Tama; Nobuyuki Mochinaga, Hachioji; Hiroki Kim, Akishima, all of Japan

[73] Assignee: Casio Computer Co., Ltd., Tokyo, Japan

[21] Appl. No.: 332,582

[22] Filed: Oct. 31, 1994

[30] Foreign Application Priority Data

| Nov. 2, 1993 | [JP] | Japan | 5-274148 |
| Nov. 2, 1993 | [JP] | Japan | 5-274244 |
| Dec. 2, 1993 | [JP] | Japan | 5-329572 |
| Dec. 2, 1993 | [JP] | Japan | 5-329599 |

[51] Int. Cl.$^6$ .......................................... B41J 3/407
[52] U.S. Cl. ............................ 400/615.2; 400/61
[58] Field of Search .......................... 400/83, 615.2, 400/61, 76, 9, 15

[56] References Cited

U.S. PATENT DOCUMENTS

| 4,827,358 | 5/1989 | Matsumoto | 358/296 |
| 5,399,030 | 3/1995 | Niwa et al. | 400/61 |
| 5,492,420 | 2/1996 | Nunokawa et al. | 400/76 |

FOREIGN PATENT DOCUMENTS

| 0497352A3 | 8/1992 | European Pat. Off. | 400/615.2 |
| 0506461A3 | 9/1992 | European Pat. Off. | 400/615.2 |
| 0577247A1 | 1/1994 | European Pat. Off. | 400/615.2 |
| 0592198A2 | 4/1994 | European Pat. Off. | 400/615.2 |
| 0600593 | 6/1994 | European Pat. Off. | 400/615.2 |
| 2120821 | 7/1983 | United Kingdom | 400/83 |

OTHER PUBLICATIONS

Patent Abstracts Of Japan, vol. 10, No. 165 (P–467) Jun. 12, 1986 & JP–A–61 018034 (Canon KK), Jan. 25, 1986.
Microsoft User's Reference 1990 pp. 399–400.

Primary Examiner—Edgar S. Burr
Assistant Examiner—Steven S. Kelley
Attorney, Agent, or Firm—Frishauf, Holtz, Goodman, Langer & Chick

[57] ABSTRACT

A plurality of types of format data items are stored in a format storage section according to the width of a label tape and the number of lines of print data. A tape width sensing section senses the width of the label tape. A control section senses the number of lines of print data. The control section reads from the format storage section a plurality of formats corresponding to the sensed label tape width and the number of lines of print data sensed, and displays them on a display section. The user selects a suitable one from the plurality of formats displayed. The control section causes a printing section to print the entered data on the label tape according to the selected format.

3 Claims, 33 Drawing Sheets

PRINT SIZE TABLE

| TAPE WIDTH | 1 LINE | 2 LINES | 3 LINES | 4 LINES | 5 LINES | 6 LINES | 7 LINES | 8 LINES | 9 & MORE LINES |
|---|---|---|---|---|---|---|---|---|---|
| 24mm | 5×5 | 2×2 | 1×1 | 1×1 | REDUCTION | REDUCTION | REDUCTION | REDUCTION | |
| 18mm | 4×4 | 2×2 | 1×1 | 1×1 | REDUCTION | REDUCTION | REDUCTION | REDUCTION | (PRINTING IS IMPOSSIBLE DUE TO TOO MANY LINES) |
| 12mm | 3×3 | 1×1 | 1×1 | REDUCTION | REDUCTION | | | | |
| 9mm | 2×2 | 1×1 | REDUCTION | REDUCTION | | | | | |
| 6mm | 1×1 | REDUCTION | | | | | | | |
| NONE | (PRINTING IS IMPOSSIBLE DUE TO MESSAGE "INSTALL TAPE CARTRIDGE") | | | | | | | | |

FIG.16

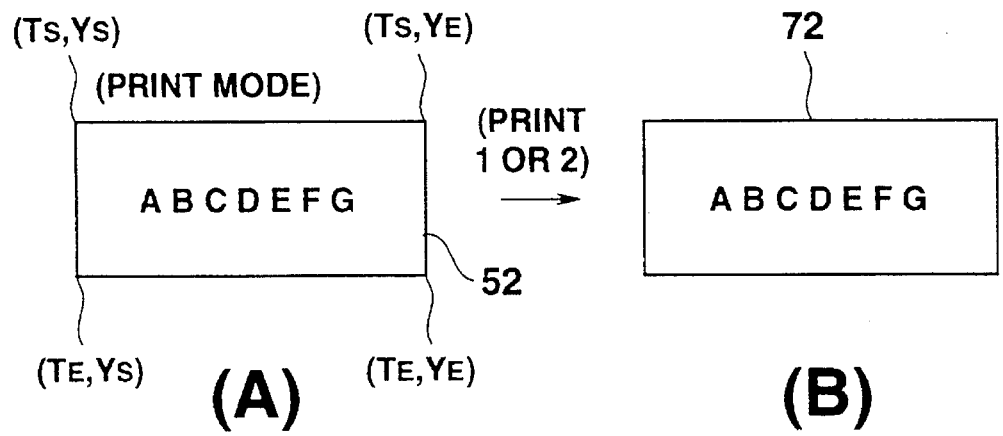
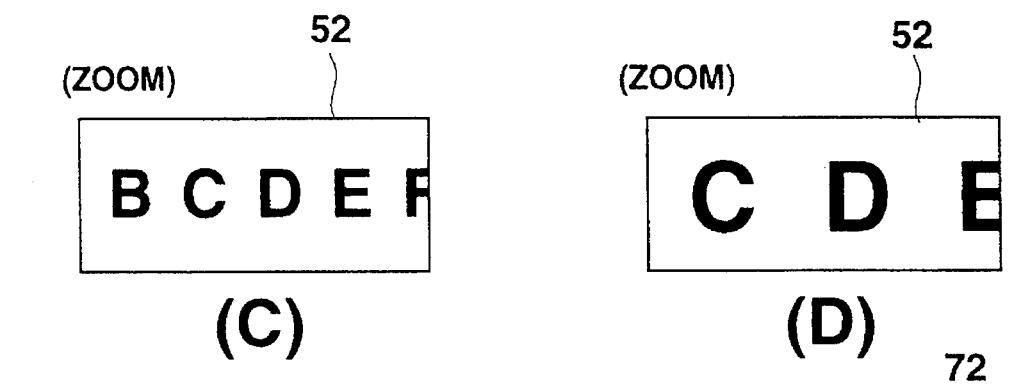
FIG.29

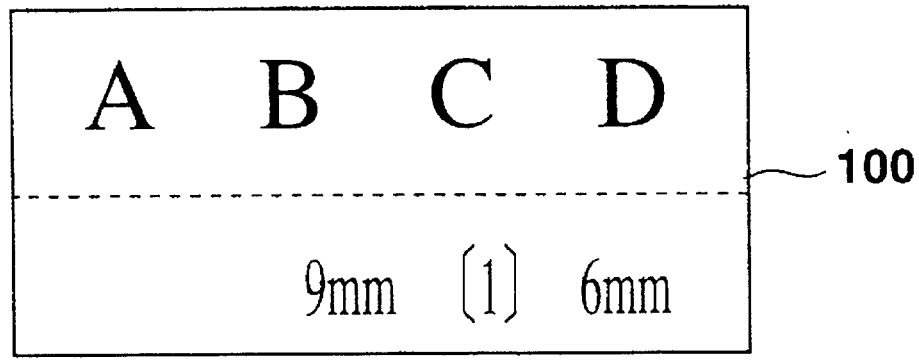
(A)
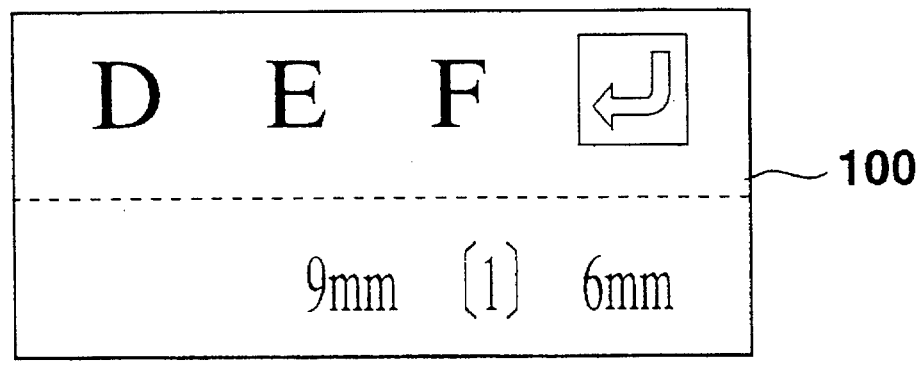
(B)
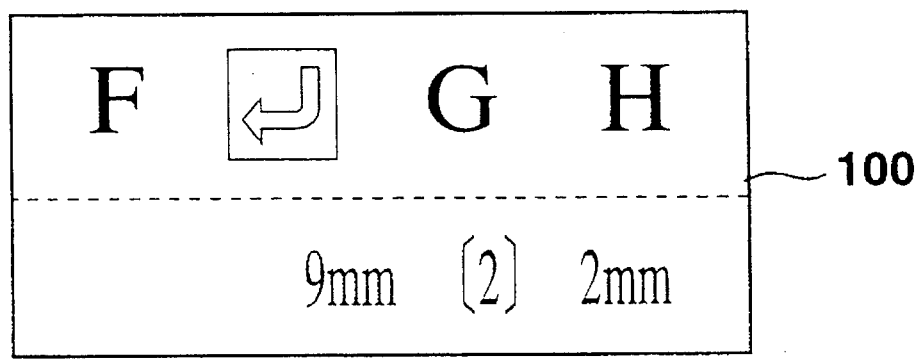
(C)
FIG.35

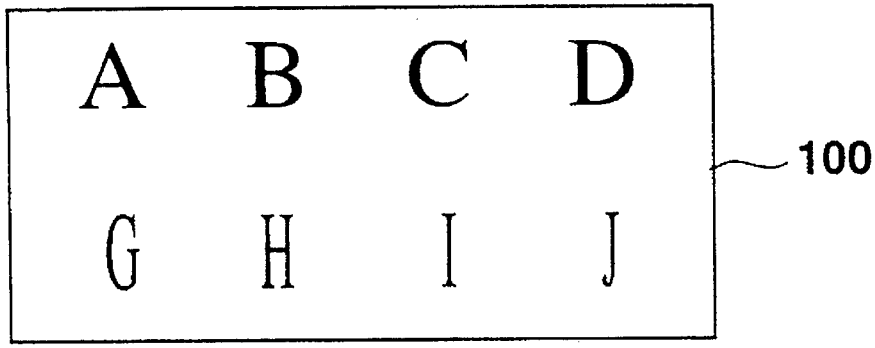
(A)
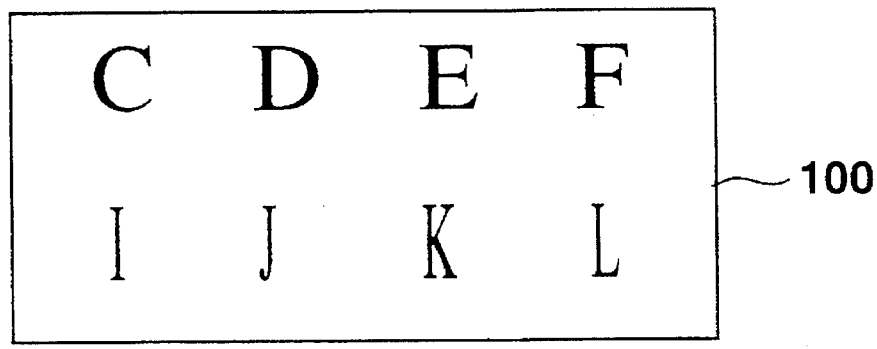
(B)
FIG.36
FIG.37

TAPE PRINTING APPARATUS THAT CALCULATES CHARACTER SIZES AND LINE LENGTHS

BACKGROUND OF THE INVENTION

1. Field of the Invention

This invention relates to a printing apparatus, and more particularly to a printing apparatus used to print character data or image data arbitrarily entered on a printing medium, such as label tape.

2. Description of the Related Art

Labels are used for various purposes, such as file management, the organization of videotapes or audio cassette tapes, or accessory management. There have been wishes that characters should be printed neatly on those labels, not written by hand. As a printing apparatus that satisfies these wishes, a label printer has been developed which allows the user to select a font or a character size arbitrarily, print characters on label tape, and cut this tape into suitable lengths to produce labels.

To make labels with a conventional label printer, the user must enter character data (print data) that he wants to print from the key input section and also set formats including the label tape width and the character size of print data before printing. Setting these formats is quite a burden to the user.

Specifically, with the label printer, it is possible to create various types of labels, such as labels for document files, videotapes, and audio cassette tapes. However, when the width of label tape changes, the number of printable lines of data, the character size in each line, etc. change accordingly, which makes the format setting complicated and troublesome. Therefore, although the user has set the formats, good print results cannot be obtained because of a badly-balanced arrangement of print data items on the label tape, or printing cannot be done because the print data items are larger than the label tape, unless the number of printable lines and the character size are appropriate for the label tape width.

Accordingly, for proper printing, the user must set formats, taking into account the label tape width, the number of lines of print data, and the character size.

Furthermore, with the conventional label printer, the key-entered character data or the image data read from an image reader first appears on the display section, such as a liquid-crystal display. To enlarge and print the displayed character data or image data as needed, a printing format is specified in such a manner that the size of character data is A mm in height and B mm in width, or double size printing is specified in advance, for example.

However, with the conventional label printer, the relationship between the size of the display area of the display section and the size of the print data appearing on the display section does not correspond to the relationship between the size of the printing medium and the size of the print data printed on the printing medium. Thus, especially when the print data is enlarged, desired results cannot be obtained, because how large the print data is printed on the printing medium cannot be known correctly beforehand.

It is convenient if whether or not the overall balance, including the arrangement of characters and the sizes of characters, is appropriate can be verified, when various sizes of characters are specified and character string data is entered. The conventional label printer is low-priced and has a small display section with an insufficient display function that can only display the entire layout of the character string entered. Because the actual characters are not displayed in this layout, it is impossible to confirm the characters in a state like the printed state. Consequently, the conventional label printer have the disadvantage of wasting label tape, although the user has actually printed characters on label tape for a trial and managed to obtain the desired print results.

SUMMARY OF THE INVENTION

Accordingly, an object of the present invention is to provide a printing apparatus which enables easy selection of the optimum format corresponding to the size of a printing medium and the number of lines of print data, thereby producing excellent print results easily without a failure.

Another object of the present invention is to provide a printing apparatus which enables print data to be printed on a printing medium in a well-balanced size and layout, thereby producing excellent print results easily.

Still another object of the present invention is to provide a printing apparatus which enables the user to exactly know how large the print data is to be printed on a printing medium before printing the print data appearing on the display section, thereby producing excellent print results easily.

Still another object of the present invention is to provide a printing apparatus which enables the user to verify the print data that is forced to appear in the printed form on the display section without trial printing on a printing medium, thereby producing excellent print results easily.

These objects are accomplished by providing a printing apparatus comprising: input means for entering print data to be printed on a printing medium; number-of-lines storage means for storing number-of-lines data on the print data entered from the input means; format storage means for storing beforehand a plurality of types of format data items consisting of the number of lines of print data and the size of print data for each line; format selecting means for selecting a corresponding format data item from the plurality of types of format data items stored in the format storage means on the basis of the number-of-lines data on the print data stored in the number-of-lines storage means; and printing means for printing the print data entered from the input means on the printing medium according to the format data selected at the format selecting means.

With the invention of such a configuration, the format selecting means selects the format corresponding to the number of lines of print data from the plurality of types of formats stored in the format storage means. Therefore, because the optimum format can be set regardless of the number of lines of print data, anybody can obtain good print results easily. Furthermore, the format setting becomes simpler and therefore the apparatus is easier to operate.

The above objects are also accomplished by providing a printing apparatus comprising: input means for entering print data; number-of-lines storing means for storing number-of-lines data on the print data entered from the input means; size storage means for storing size data on a printing medium on which print data is to be printed; format storage means for storing beforehand a plurality of types of format data items on the basis of the size of the printing medium and the number of lines of print data; format selecting means for selecting a corresponding format data item from the plurality of types of format data items stored in the format storage means on the basis of the size data on the printing medium stored in the size storage means and the number-of-lines data on the print data stored in the number-of-lines storage means; and printing means for printing the print data entered from the input means on the printing medium according to the format data selected at the format selecting means.

With the invention of such a configuration, the format selecting means selects the format corresponding to the size of a printing medium and the number of lines of print data from the plurality of types of formats stored in the format storage means. Therefore, because the optimum format can be set regardless of the size of a printing medium and the number of lines of print data, anybody can obtain good print results easily without a failure. Furthermore, the format setting becomes simpler and therefore the apparatus is easier to operate.

The above objects are also accomplished by providing a printing apparatus comprising: input means for entering print data; number-of-lines storage means for storing number-of-lines data on the print data entered from the input means; printing medium size storage means for storing size data on a printing medium on which print data is to be printed; print size storage means for storing beforehand size data on each character in the print data corresponding to the size of the printing medium and the number of lines of print data; data reading means for reading from the print size storage means the size data on each character in the print data corresponding to the number-of-lines data on the print data stored in the number-of-lines storage means and the size data on the printing medium stored in the printing medium size storage means; print data creating means for creating dot pattern data from the print data on the basis of the size data on each character in the print data read by the data reading means; and printing means for printing the dot pattern data corresponding to the print data created by the print data creating means on the printing medium.

With the invention of such a configuration, the size of print data can be adjusted optimally according to the size of a printing medium and the number of lines to be printed. Therefore, well-balanced data can be printed on a printing medium without setting complicated formats, thereby producing good print results.

The above objects are also accomplished by providing a printing apparatus comprising: input means for entering print data to be printed on a printing medium; data storage means for storing the print data entered from the input means; display means for displaying the print data stored in the data storage means; enlarged display control means for enlarging the print data displayed on the display means and displaying the enlarged data; and printing means for printing the print data stored in the data storage means on the printing medium according to the ratio of the size of the display means to the size of the print data displayed on the display means.

With the invention of such a configuration, both the print data displayed on the display means and the print data enlarged by the enlarged display control means can be printed on a printing medium according to the ratio of the size of the display area of the display means to the size of the print data displayed therein, thereby enabling the user to confirm the print state on the display means beforehand. Therefore, it is possible to obtain a desired print result without a failure.

The above objects are also accomplished by providing a printing apparatus comprising: input means for entering print data and format data; storage means for storing the print data and the format data entered from the input means; printing means for printing the print data stored in the storage means on a printing medium according to the format data; and display means for displaying the print data in the form of data printed on the printing medium by the printing means.

With the invention of such a configuration, because the display means displays print data in the printed form, it is possible to obtain an excellent print result without a failure by verifying the display before printing. Furthermore, because the user need not print on a printing medium for verification, a waste of the printing medium can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 16 shows a print size table in the label printer in the above embodiments;

FIGS. 29A–29F show how print data is displayed and printed on label tape in the enlarged display and printing process by the label printer according to the fifth embodiment of the present invention;

FIGS. 35A–35C show display states when print data is entered in the label printer according to the sixth embodiment of the present invention;

FIGS. 36A and 36B show display states when images are displayed in the label printer according to the sixth embodiment of the present invention; and FIG. 37 shows a print state on the label printer according to the sixth embodiment of the present invention.

DETAILED DESCRIPTION OF THE PREFERRED EMBODIMENTS

Hereinafter, referring to the accompanying drawings, embodiments of the present invention will be explained.

Figure 1:
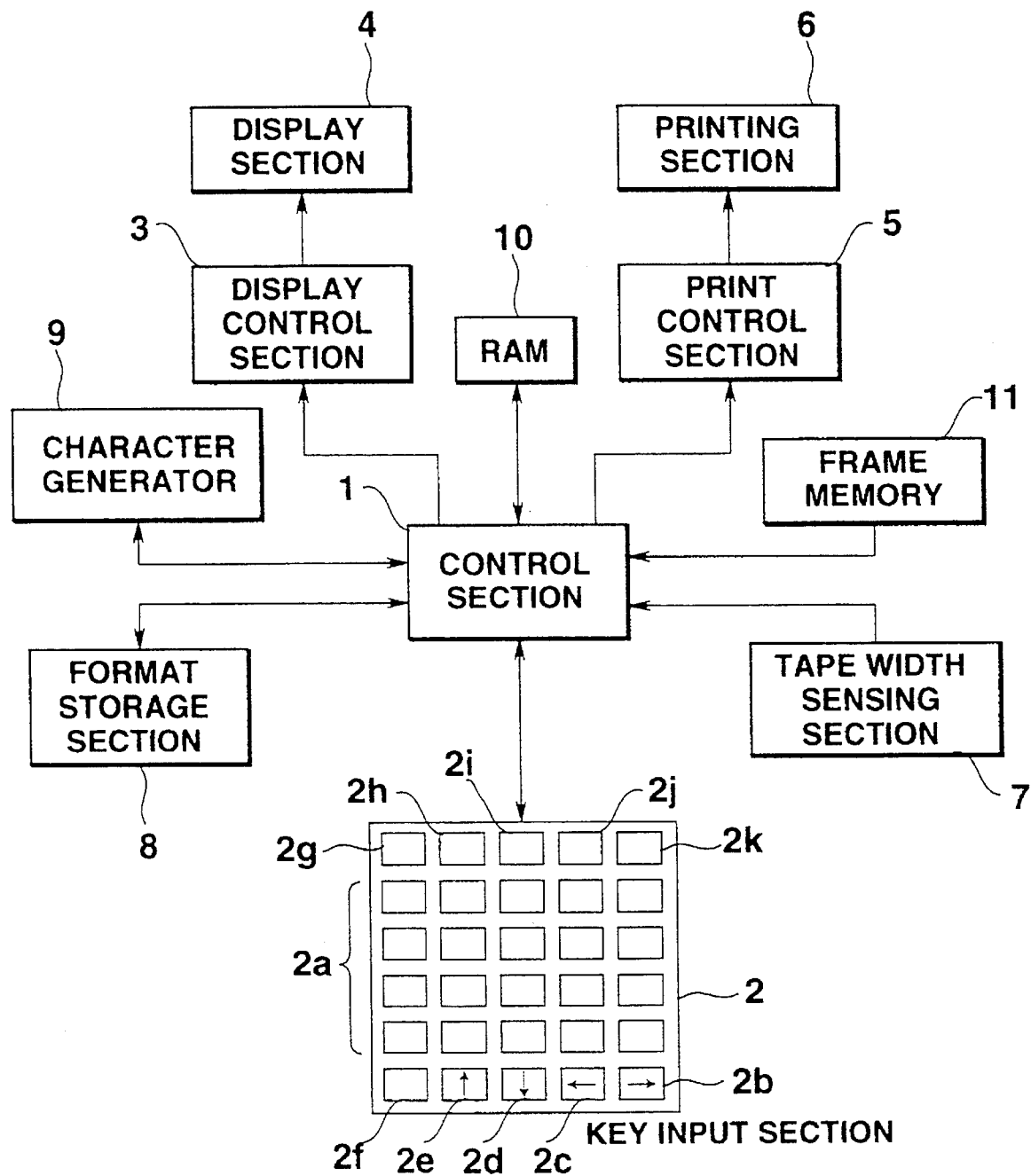
FIG. 1 is a block diagram of a label printer according to a first and a second embodiment of the present invention.
Figure 2:
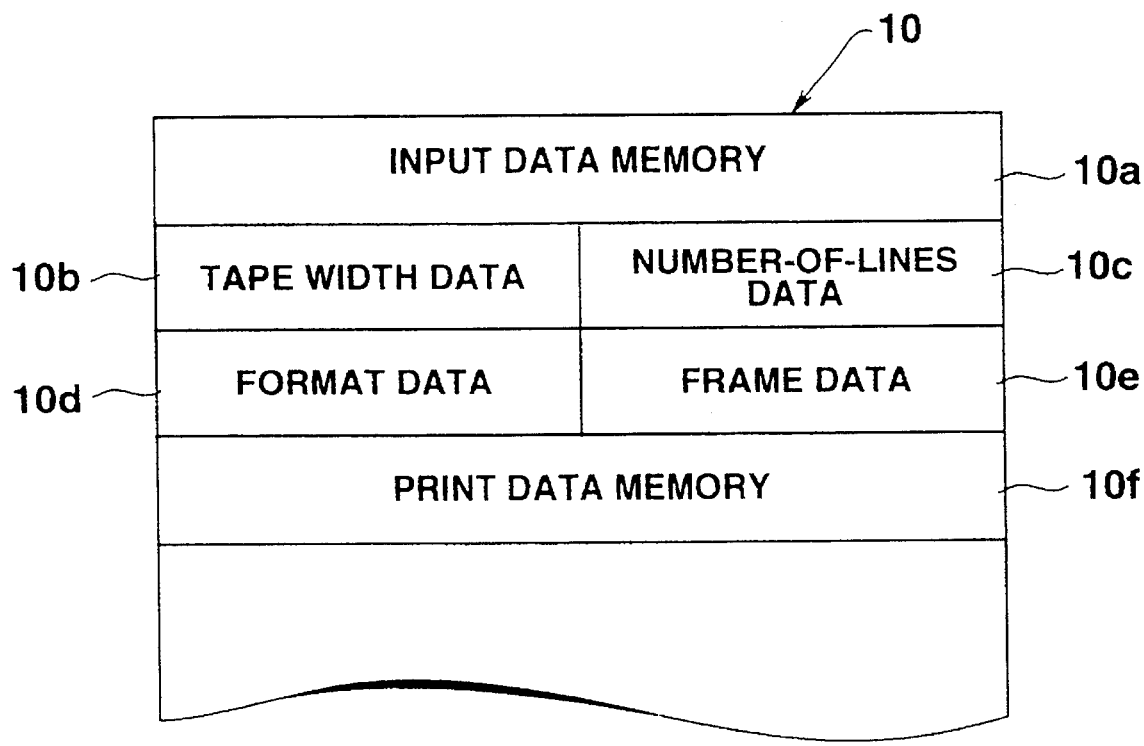
FIG. 2 shows the structure of the label printer RAM in the first and second embodiments of the present invention.

FIG. 1 is a block diagram of a label printer according to a first embodiment of the present invention.

As shown in FIG. 1, the label printer comprises a control section 1, a key input section 2, a display control section 3, a display section 4, a print control section 5, a printing section 6, a tape width sensing section 7, a format storage section 8, a character generator 9, a RAM 10, and a frame memory 11 (used in a second embodiment only).

The control section 1 is composed of a microprocessor, a program ROM, and its peripheral circuitry. It controls the entire operation of the label printer according to a control program.

The key input section 2 is provided with a keyboard, a keyboard interface, and an input buffer. It supplies input data to the control section 1. The keyboard contains character keys 2a, cursor keys 2b to 2e, an execute key 2f, a format key 2g for specifying format setting, a print key 2h for specifying print, a frame key 2i for specifying frame selection, a cancel key 2j, and a return key 2k.

The display control section 3 controls the display section 4 under the control of the control section 1.

The display section 4 is made up of a dot matrix liquid-crystal unit, for example. It displays input data, selection menus, etc.

The print control section 5 controls the printing section 6 under the control of the control section 1.

The printing section 6 is provided with a thermal head and a driving section for the thermal head, label tape, and an ink ribbon. It thermally drives each heat element of the thermal head under the control of the print control section 5, thereby printing the print data entered from the key input section 2 on label tape, while transporting the label tape (a printing medium) and an ink ribbon.

Figure 12:
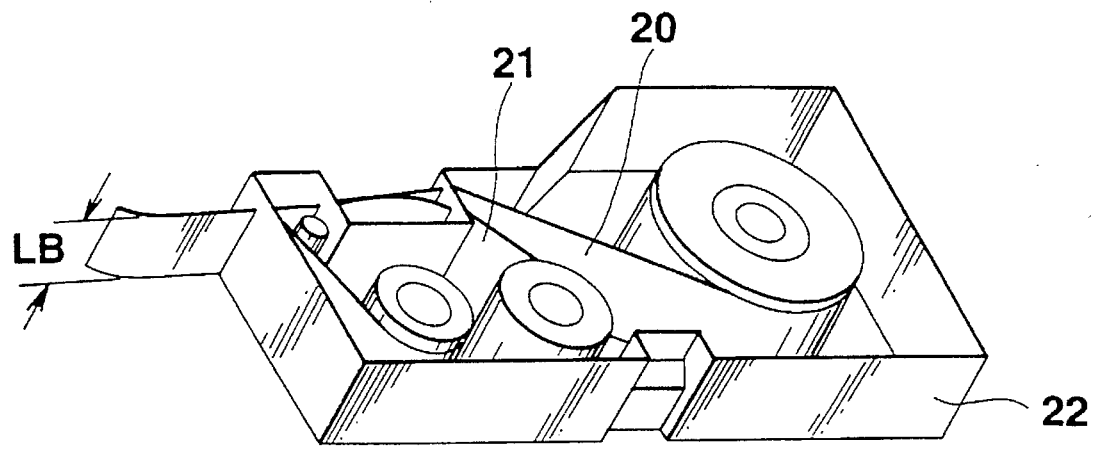
FIG. 12 shows the construction of the tape cartridge in the label printer in the first and second embodiments.
Figure 13:
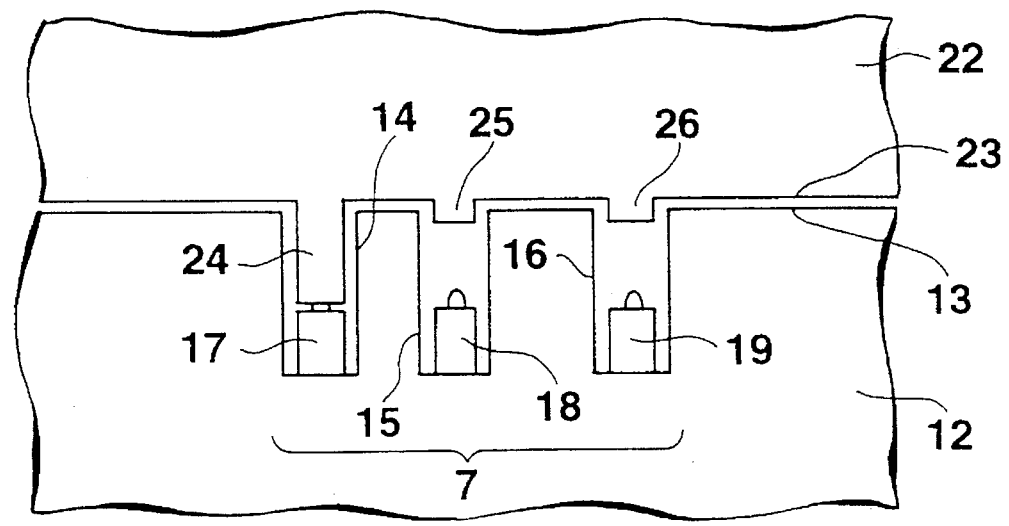
FIG. 13 shows the relationship between the tape cartridge and the label printer body in the label printer of the first and second embodiments.

The tape width sensing section 7, as shown in FIGS. 12 and 13, senses the type of a tape cartridge 22 installed on the label printer body 12, and then the width LB of the label tape 20 housed in the tape cartridge 22, and thereafter sends these sense signals to the control section 1.

The format storage section 8 stores format data items that can be selected according to the width LB of label tape 20 and the number of lines of print data. The format data items stored in the format storage section 8 will be explained later, referring to FIG. 3.

The character generator 9 is a dot pattern memory for converting the input data from the key input section 2 into display pattern data to be displayed on the display section 4 and also into print pattern data to be printed on the printing section 6.

The RAM 10, which functions as a work memory of the control section 1, comprises an input data memory 10a for storing the character data entered from the key input section 2 in the form of character codes, an area 10b for storing the width data on the label tape sensed at the tape width sensing section 7, an area 10c for storing data about the number of lines of the character data (print data) entered from the key input section 2, an area 10d for storing the format data items selected from a plurality of format data items stored in the format storage section 8, an area 10e for storing the frame data items selected in a second embodiment explained later, and a print data memory 10f for storing in dot patterns the print data to be supplied to the printing section 6, which prints it on label tape.

Figure 3:
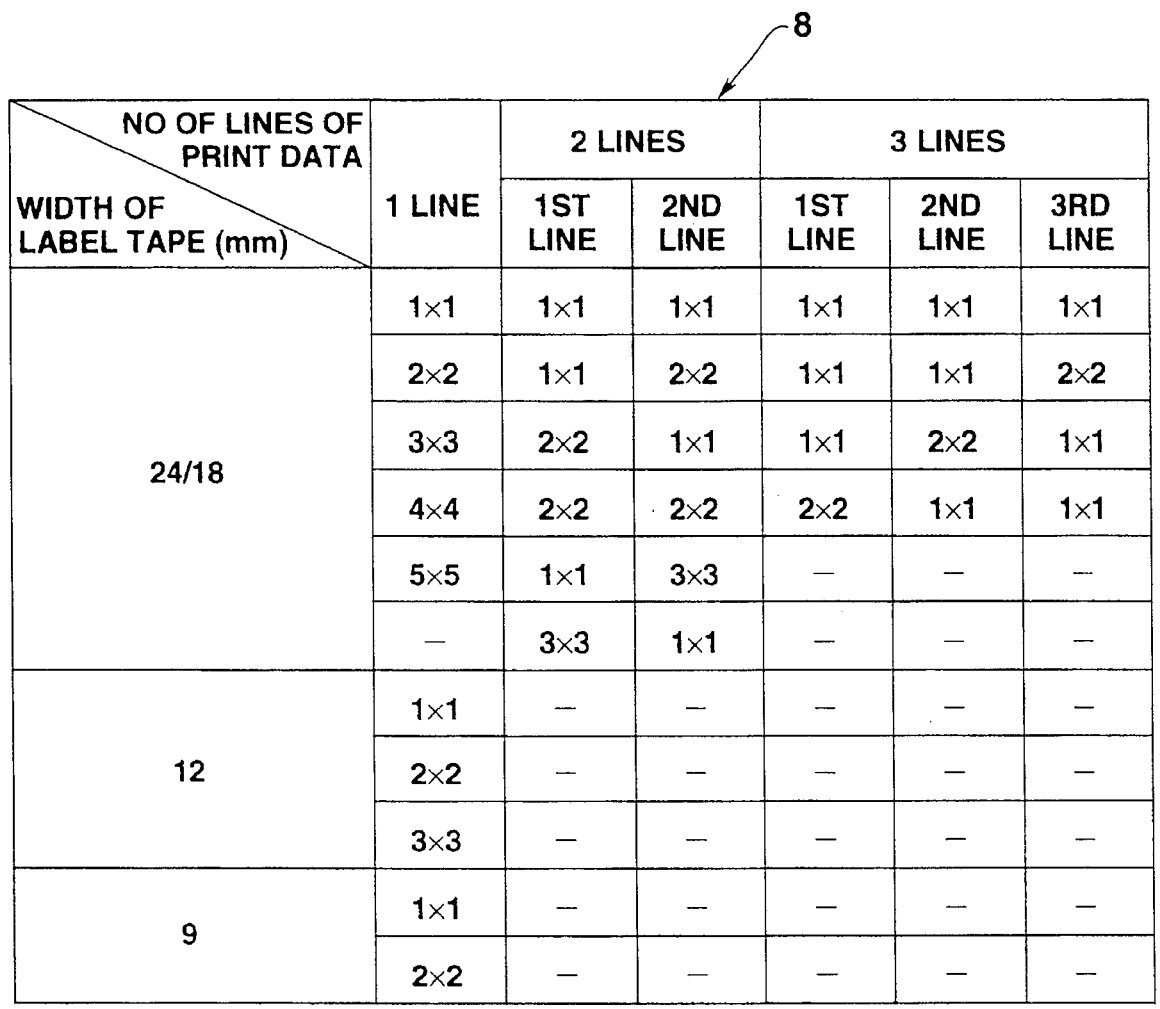
FIG. 3 shows an example of the format data stored in the format storage section of the label printer in the first embodiment of the present invention.

As shown in FIG. 3, the format storage section 8 stores a set of formats which, according to the width LB of label tape 20 and the number of lines of print data, allow data of the number of lines to be printed on the label tape 20 of the width. In other words, the printable size of print data can be stored for each line according to the width LB of label tape 20 and the number of lines of print data.

Specifically, in this embodiment, it is assumed that 24-mm, 18-mm, 12-mm, 9-mm, and 6-mm-wide label tapes 20, or label tape with five different widths, can be used. The format storage section 8 stores the format data items that can be selected and set for each of the following cases: where the width LB of label tape 20 is 24 mm or 18 mm and the print data has one to three lines, where the width LB of label tape 20 is 12 mm with and the print data has one line, and where the width LB of label tape 20 is 9 mm and the print data has one line. Regarding label tape 20 with a width LB of 6 mm and the number of lines, except the above cases, such format data is not stored in the format storage section 8 because there is only one format that can be set and therefore another format cannot be selected. Each format includes print magnification for each line. A×A means that characters are printed A times as large in height and width as the basic print size (1×1).

For example, when the print data has one line and the width LB of label tape 20 is 24 mm or 18 mm, it is possible to select the following format data items: (1) that for printing characters at 1×1, (2) that for printing characters at 2×2, (3) that for printing characters at 3×3, (4) that for printing characters at 4×4, and (5) that for printing characters at 5×5 (see FIG. 3). These five format data items are stored in the format storage section 8.

The operation of the label printer with the above configuration will be described with reference to FIGS. 4 and 5.

Figure 4:
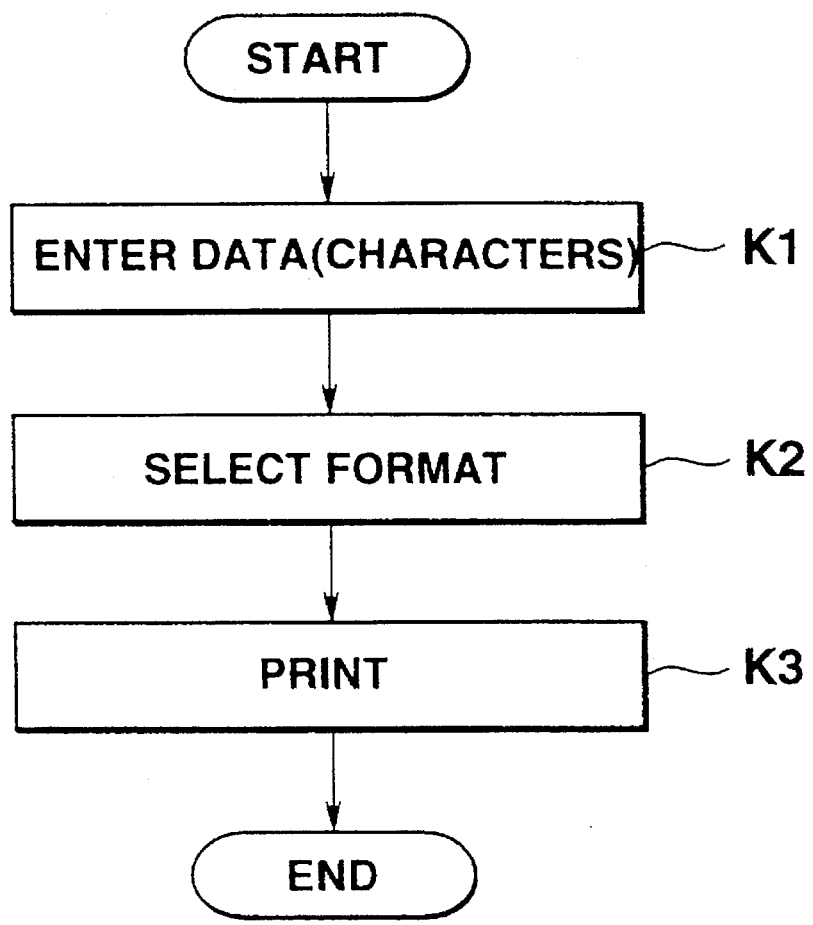
FIG. 4 is a flowchart to help explain the operation of the label printer in the first embodiment of the present invention.

The major operations of the label printer consist roughly of three steps of entering data (step K1), selecting a format (step K2), and printing data (step K3), as shown in FIG. 4.

First, the user operates character keys 2a in the key input section 2 to enter character data items to be printed. When print extends over a plurality of lines, new line marks are inserted between lines by operating the return key 2k. For example, when the user wants to print "NO FIRE !" and "NO SMOKING EXCEPT THE SMOKING AREA" on the first line and the second line, respectively, he operates character keys 2a, the return key 2k, etc to enter "NO FIRE ! (new line) NO SMOKING EXCEPT THE SMOKING AREA." In the meantime, the control section 1 stores the entered data in the input data memory 10a of the RAM 10, converts the data into display fonts using the character generator 9, and displays the display fonts on the display section 4.

After the data input has finished, the user operates the format key 2h in the key input section 2 to set a format for printing. In response to the operation of the format key 2h, the control section 1 starts the processing shown in the flowchart of FIG. 6. First, the control section 1 senses the number of lines of the print data (the entered data) stored in the RAM 10, or the number of print lines (step P1). The number of lines can be obtained easily by adding one to the number of new line codes contained in the entered data, for example. The sensed number of lines of print data is stored in the storage area 10c of the RAM 10.

Then, the control section 1 takes in the tape width sense signal from the tape width sensing section 7 (step P2) and senses the width LB of the label tape 20 housed in the tape cartridge 22 installed on the label printer body 12 (step P3). The sensed width LB of label tape 20 is stored in the storage area 10b of the RAM 10.

When the width LB of label tape 20 is 0, or when the tape cartridge 22 has not been installed on the label printer body 12, the control section 1 displays on the display section 4 the warning message that a tape cartridge 22 of label tape 20 should be installed (step P4).

When the width LB of label tape 20 is 6 mm, the control section 1 displays on the display section 4 the warning message that a format cannot be selected, because the format is limited to only one type (step P5).

When the width LB of label tape 20 is any of 24 mm, 18 mm, 12 mm, and 9 mm, the control section 1 judges which combination stored in the format storage section 8 corresponds to the combination of the width LB of label tape 20 and the number of lines of print data (step P6). When the combination of the width LB of label tape 20 sensed at the tape width sensing section 7 and the number of lines of print data entered from the key input section 2 does not correspond to any combinations set in the format storage section 8, the control section 1 displays on the display section 4 the warning message that format selection cannot be effected (step P5).

When the combination of the width LB of label tape 20 and the number of lines of print data corresponds to one of the combinations set in the format storage section 8, the control section 1 displays on the display section 4 the format select screen for selecting the format corresponding to the combination (step P7).

Figure 7:
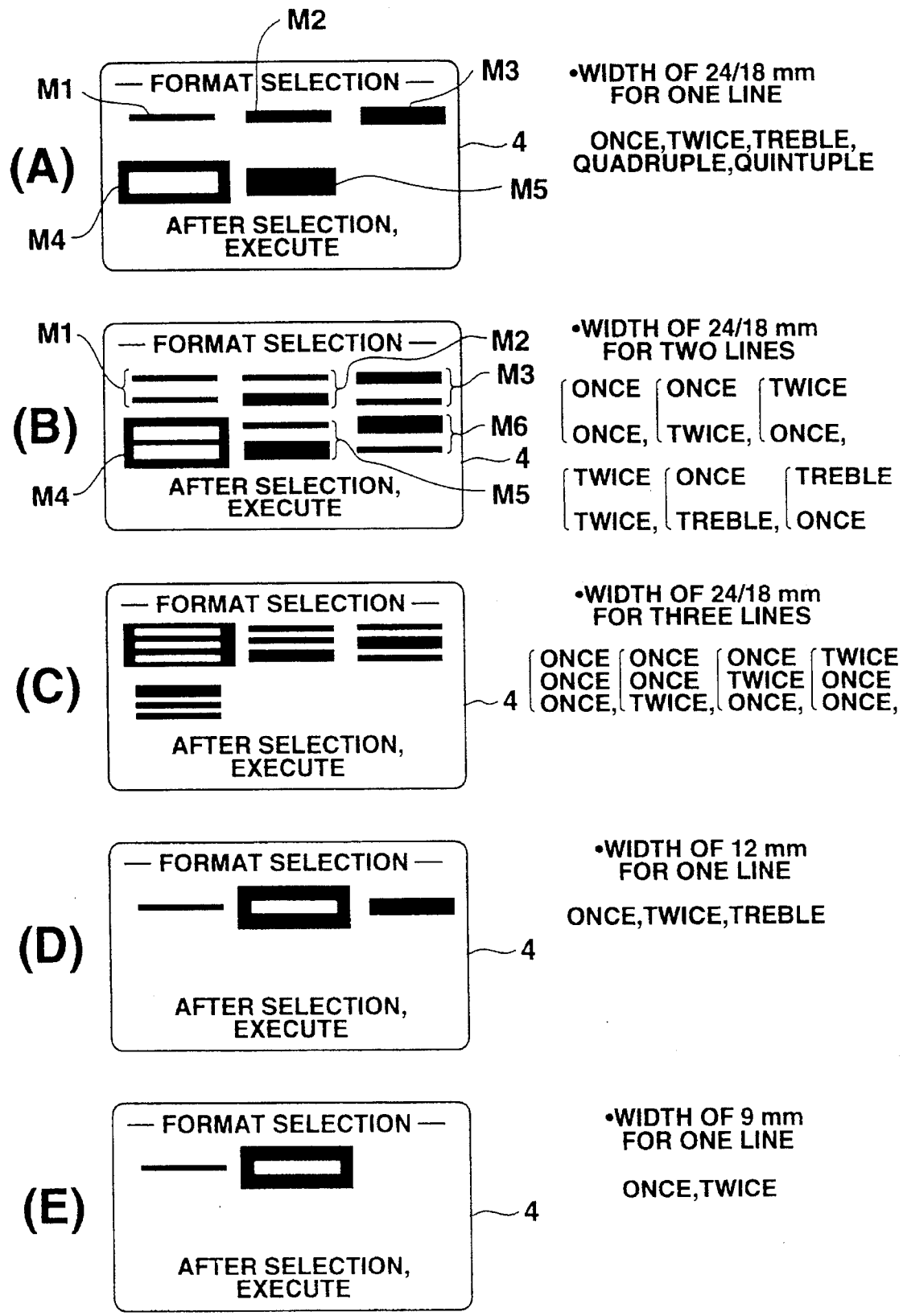
FIGS. 7A–7E show examples of the format setting screen of the label printer in the first embodiment of the present invention.

Examples of the format select screen on the display section 4 are shown at (A) to (E) in FIG. 7.

Each format select screen visually shows the print size for each line in printing data according to the format. FIG. 7 shows at (A) a screen for selecting format data items when the width LB of label tape 20 is 24 mm or 18 mm and the print data has one line; FIG. 7(B) shows a screen for selecting format data items when the width LB of label tape 20 is 24 mm or 18 mm and the print data has two line; FIG. 7 shows at (C) a screen for selecting format data items when the width LB of label tape 20 is 24 mm or 18 mm and the print data has three lines; FIG. 7 shows at (D) a screen for selecting format data items when the width LB of label tape 20 is 12 mm and the print data has one line; and FIG. 7 shows at (E) a screen for selecting format data items when the width LB of label tape 20 is 9 mm and the print data has one line.

In the respective select screens shown at (A) to (E) in FIG. 7, the width of the black stripe marks displayed corresponds to the print size of characters in the line to be printed. When the mark overlaps with the cursor, the overlapped portions are displayed reversely.

Figure 6:
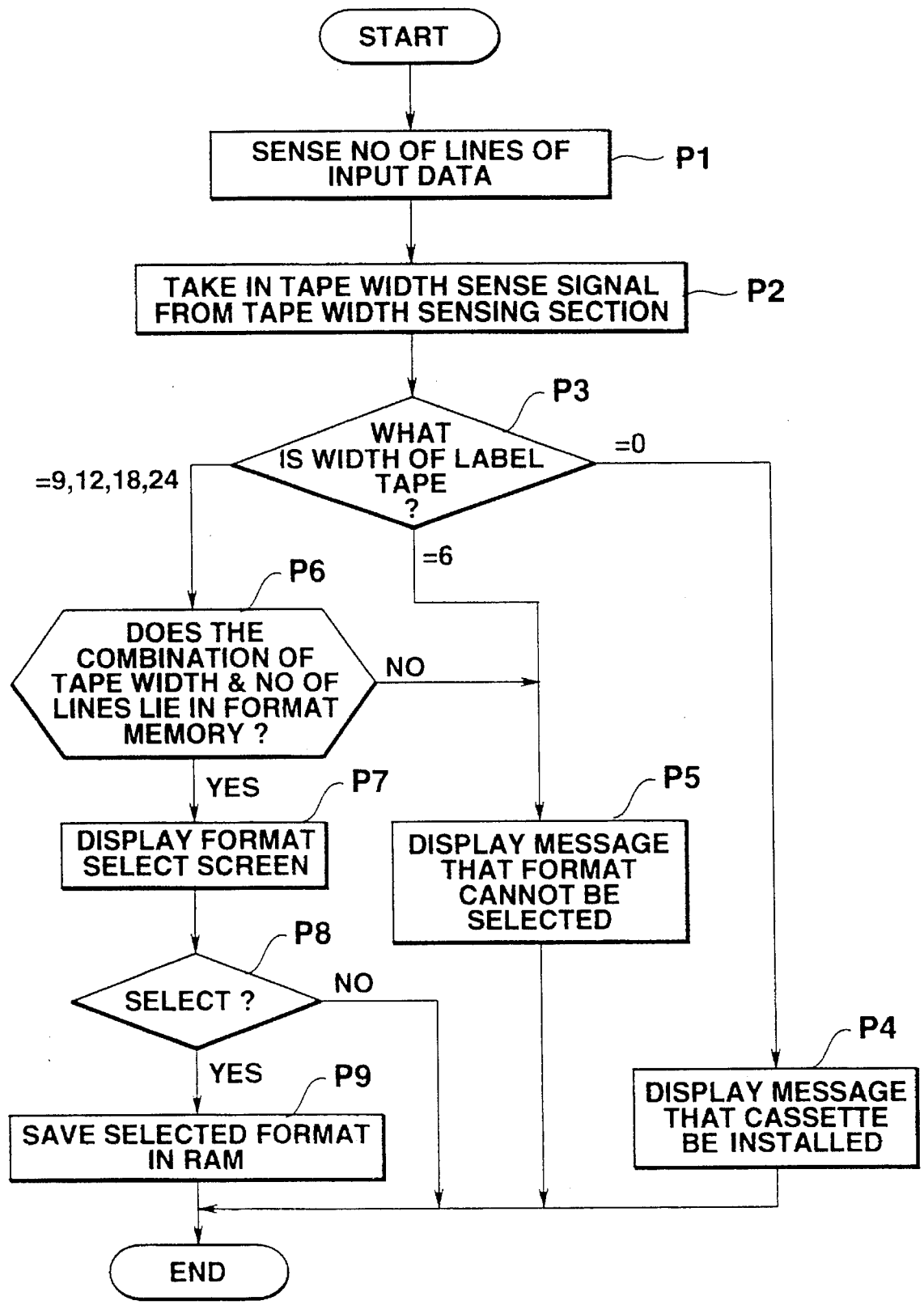
FIG. 6 is a flowchart to help explain the format setting on the label printer in the first embodiment of the present invention.

For example, at step P6 of FIG. 6, when it is judged that the width LB of label tape 20 is 24 mm or 18 mm and the print data has two lines, according to what is stored in the format storage section 8 shown in FIG. 3, it is possible to select any one of the following six format data items: (1) that for printing the characters on the first line and the second line at 1×1, (2) that for printing the characters on the first line at 1×1 and the ones on the second line at 2×2, (3) that for printing the characters on the first line at 2×2 and the ones on the second line at 1×1, (4) that for printing the characters on the first line and the second line at 2×2, (5) that for printing the characters on the first line at 1×1 and the ones on the second line at 3×3, and (6) that for printing the characters on the first line at 3×3 and the ones on the second line at 1×1.

The format select screen at (B) in FIG. 7 shows images printed on the basis of these six format data items. Specifically, at (B) in FIG. 7, (1) two black stripe marks M1 at the upper left represent print images in printing characters in the first and the second line at a magnification of 1×1, (2) black stripe marks M2 in the upper middle of the menu represent print images in printing characters in the first line at a magnification of 1×1 and those in the second line at a magnification of 2×2, (3) black stripe marks M3 at the upper right of the menu represent print images in printing characters in the first line at a magnification of 2×2 and those in the second line at a magnification of 1×1, (4) two white stripe marks M4 (reversed display due to the cursor) at the lower left represent print images in printing characters in the first and the second line at a magnification of 2×2, (5) two black stripe marks M5 in the lower middle of the menu represent print images in printing characters in the first line at a magnification of 1×1 and those in the second line at a magnification of 3×3, (6) two black stripe marks M6 at the lower right of the menu represent print images in printing characters in the first line at a magnification of 3×3 and those in the second line at a magnification of 1×1.

The user operates cursor keys 2b to 2e and execute key 2f to select one of the displayed print images (black stripe marks M1 to M3, M5, M6, and white stripe mark M4) (step P8). When the user does not want to select any, he has only to operate the cancel key 2j. The selection result is stored in the format data storage area 10d of the RAM (step P9). This completes the setting of format data items according to the width LB of label tape 20 and the number of lines of print data, using the format storage section 8.

Then, the user operates the print key 2h in the key input section 2. In response to the key operation, the control section 1 reads from the format storage section 8 the format data item corresponding to the selection result stored in the RAM 10. It then converts the print data stored in the RAM 10 into dot pattern data using the character generator 9, enlarges it at the magnification determined by the format data item, and thereafter writes the enlarged data in the print data memory 10f of the RAM 10 in the form of print patterns (dot patterns).

After print patterns have been created at the RAM 10, the control section 1 segments the print data created in dot patterns into lines of the heat elements of the printing section 6 and then supplies these to the printing section 6. The printing section 6 prints on the label tape 20 according to the print data supplied. By the above processes, the print data (input data) is printed on the label tape 20 according to the selected format data items.

For example, when the print data has two lines and the width LB of label tape 20 is 24 mm, it is possible to select one from the above six format data items. For selection, the select screen shown at (B) in FIG. 7 appears. If the user selects the black stripe marks M1 at the upper left of the screen, "NO FIRE !," "NO SMOKING EXCEPT THE SMOKING AREA" are printed on the label tape 20 on the first line R1 and the second line R2 in a print size once as large in height and width as the basic print size, according to the settings (1×1 for the first and second lines) in the format storage section 8, as shown at (A) in FIG. 5.

Figure 5:
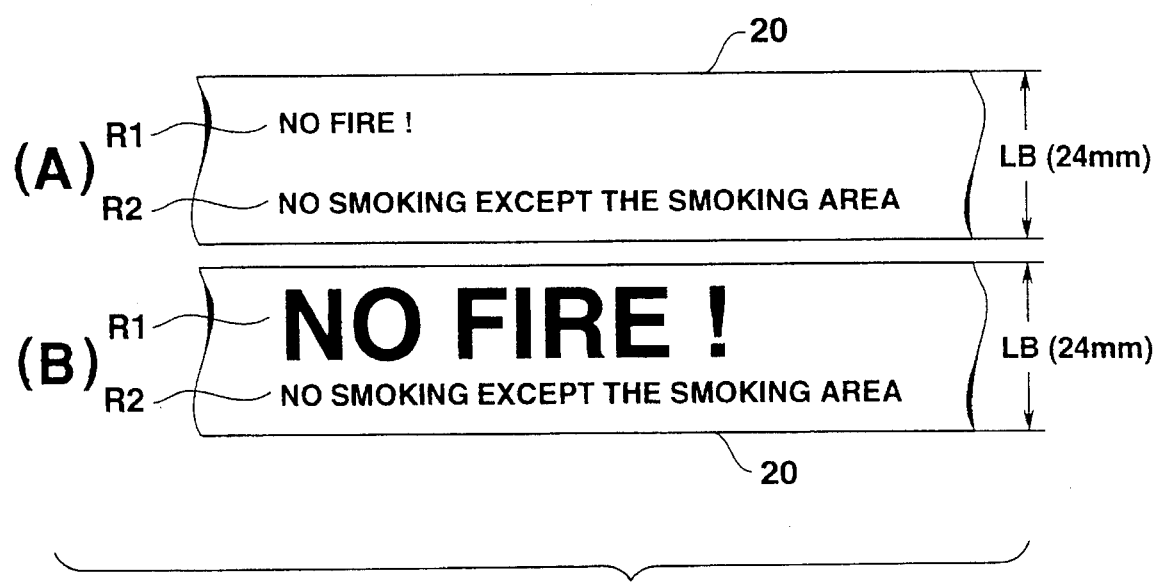
FIGS. 5A and 5B show examples of print made on label tape by the label printer in the first embodiment of the present invention.

If the user selects the black stripe marks M6 at the lower right of the screen, "NO FIRE!" is printed on the first line R1 of the label tape 20 in a size three times as large in height and width as the basic print size and "NO SMOKING EXCEPT THE SMOKING AREA" are printed on the second line R2 in a print size once as large in height and width as the basic print size, according to the settings (3×3 for the first line and 1×1 for the second line) in the format storage section 8, as shown at (B) in FIG. 5.

As described above, with the embodiment, according to a combination of the width LB of label tape 20 installed on the label printer body 12 and the number of lines of print data, candidates for format data items printable within the width LB of label tape 20 are selectively displayed. Therefore, by selecting one of the format data candidates displayed, the user can set format data without performing complicated format data setting. Furthermore, print data can be printed within the width LB of label tape 20 line by line in a size (at a magnification) that the user wants.

Hereinafter, a second embodiment of the present invention will be explained.

A label printer according to the second embodiment is constructed by adding the function of decorating the outside of the print data consisting of character data with a frame and printing this decorated data, to the label printer of the first embodiment. The label printer of the second embodiment differs from that of the first embodiment in that a frame memory 11 is added in the block diagram of FIG. 1.

Figure 9:
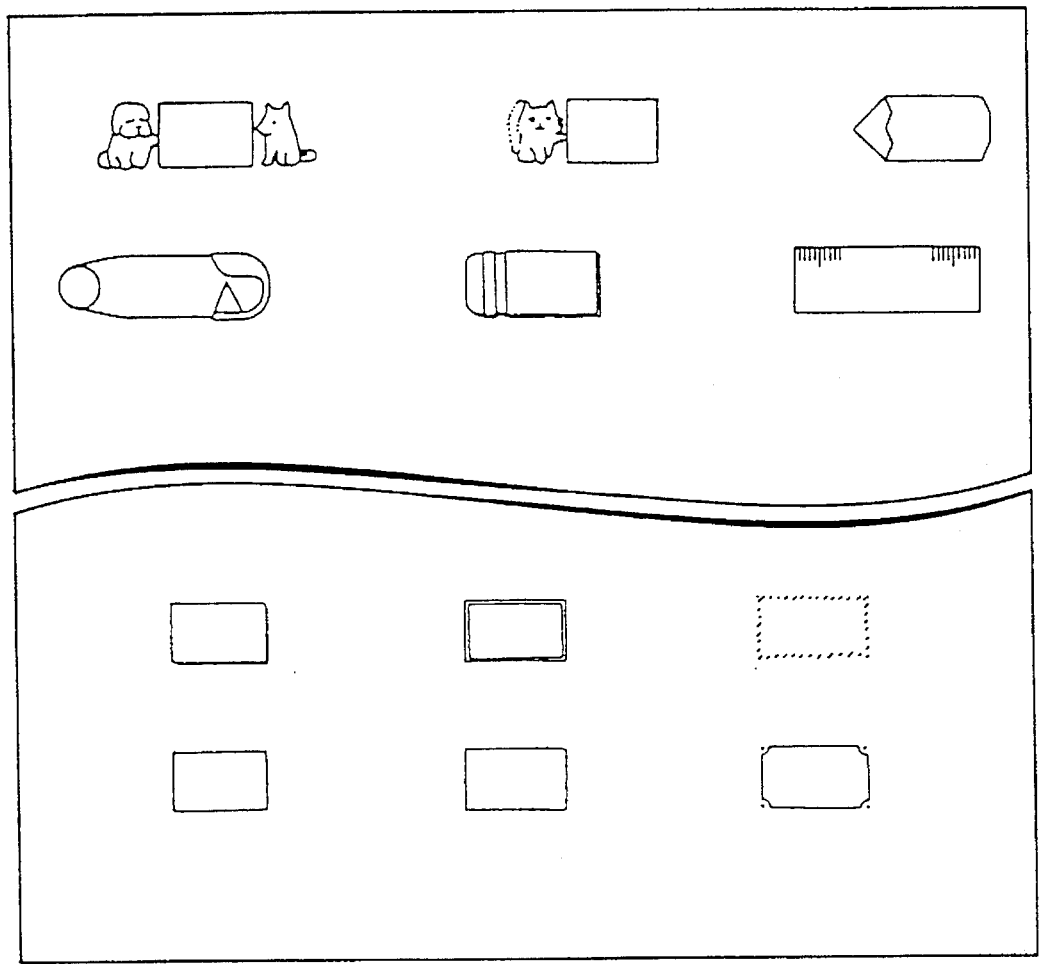
FIG. 9 is a diagram to help explain a plurality of frame data items stored in the frame memory of the label printer in the second embodiment of the present invention.

The frame memory 11 of FIG. 1 stores data on a plurality of types of frames as shown in FIG. 9, for example.

The label printer of the second embodiment selects one of frames as shown in FIG. 9, combines the selected frame data with the character data entered from the key input section 2, and prints the characters with a frame.

Figure 8:
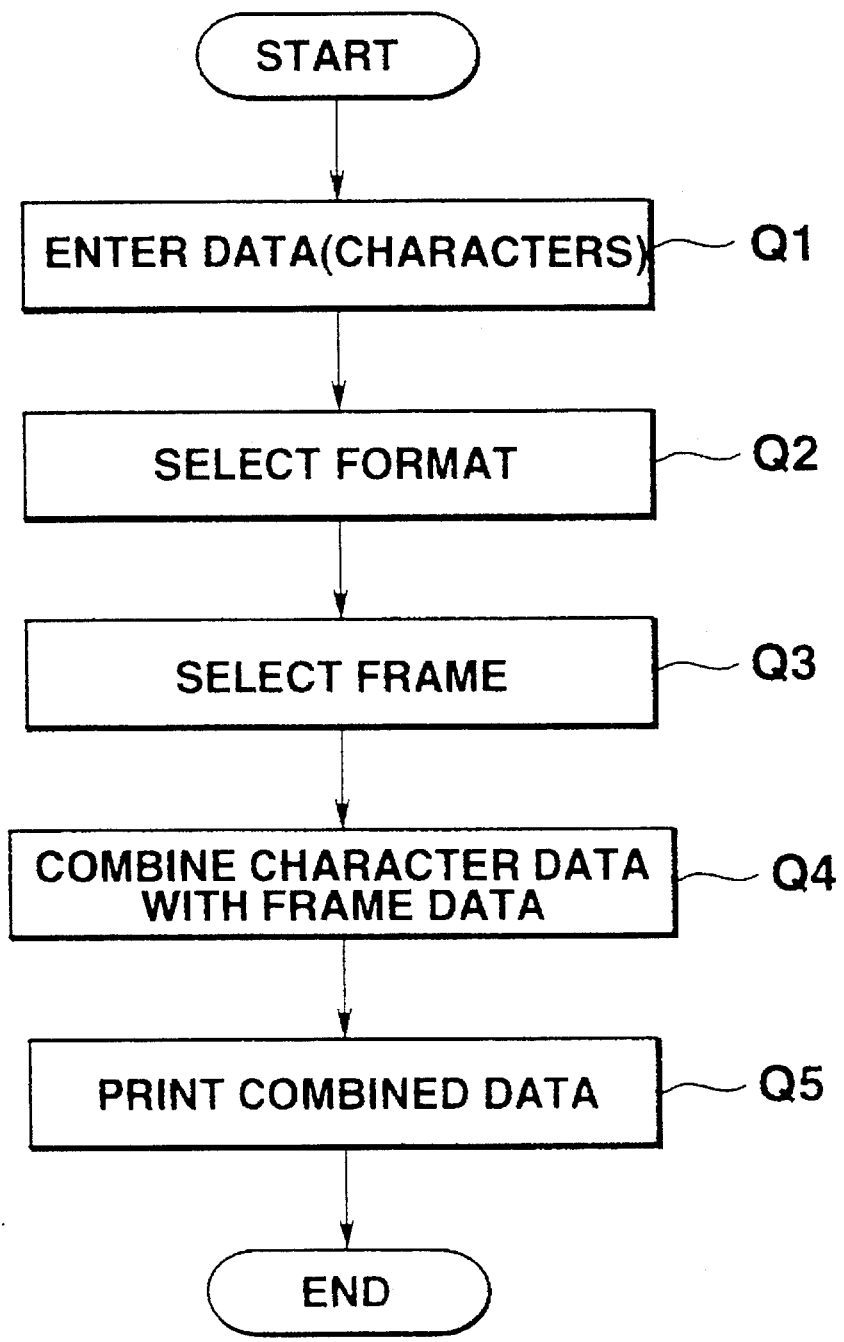
FIG. 8 is a flowchart to help explain the operation of the label printer according to the second embodiment of the present invention.

FIG. 8 is a flowchart to help explain the operation of the label printer of the second embodiment.

For example, to combine the input data consisting of character data with given frame data, the user first enters the character data from the key input section 2. The character code data corresponding to the entered character data is stored in the input data memory 10a of the RAM 10 (step Q1).

After the character data has been entered, formats are selected in the same manner as the first embodiment (step Q2).

Then, the user operates the frame key 2i in the key input section 2 to specify frame selection, for example. In response to this specification, the control section 1 displays a plurality of frame data items stored previously in the frame memory 11 on the display section 4. Because all of the frame data items cannot be displayed at a time under restriction of the display capacity of the display section 4, a plurality of frame data items are displayed sequentially on the display section 4 by operating the cursor keys 2b to 2e. The user operates the cursor keys 2b to 2e and the execute key 2f to select a given frame data item. The selected data item is stored in the storage area 10e of RAM 10 (step Q3).

Then, when the print key 2h is operated, the input data is written in the print data memory 10f of the RAM 10 in the form of dot patterns according to the selected format. At this time, the dot patterns of the selected frame data are enlarged so as to coincide with the selected format and is written in the print data memory 10f of RAM 10, thereby combining the character data with the frame data enclosing the character data (step Q4).

A further explanation of frame data will be given.

Figure 10:
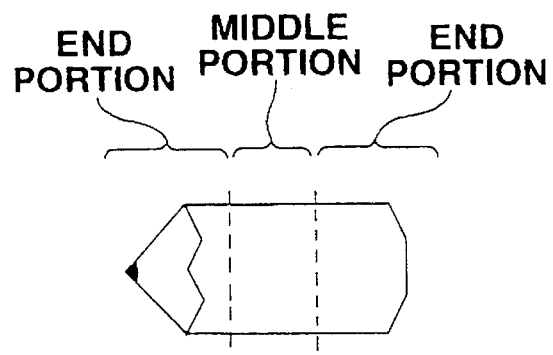
FIG. 10 is a diagram to help explain the structure of a frame data item used in the label printer of the second embodiment of the present invention.

For example, each frame as shown in FIG. 9 consists of two end portions at the right and left and a middle portion connecting these end portions, as shown in FIG. 10. Data on the two end portions is stored previously in the basic size of 1×1 in the frame memory 11 in the form of dot pattern data. The data on the end portions is enlarged in height, as necessary, so as to coincide with the selected format, when being combined with the character data. Data on the middle portion of FIG. 10 is for straight lines just connecting the two end portions. Because the length of the character data to be decorated changes, the control section 1 creates the straight line in the RAM 10 according to a program.

The combination of character data with frame data will be described further. When the print key 2h is operated, the character pattern data corresponding to the character code of the character data stored in the input data memory 10a of the RAM 10 is outputted from the character generator 9. This character pattern data is enlarged, as necessary, on the basis of the selected format data stored in the storage area 10d of RAM 10, and then is written as dot pattern data in the print data memory 10f. Furthermore, the selected frame data (the dot pattern data for the right and left end portions) stored in the storage area 10e of the RAM 10 is enlarged in height, as necessary, so as to enclose the character data. The enlarged data is positioned at the right and left ends of the character data and then written in the print data memory 10f of the RAM 10. Then, the control section 1 further writes the dot pattern data forming the middle portion of the frame into the print data memory 10f, thereby combining the character data with the frame data.

Figure 11:
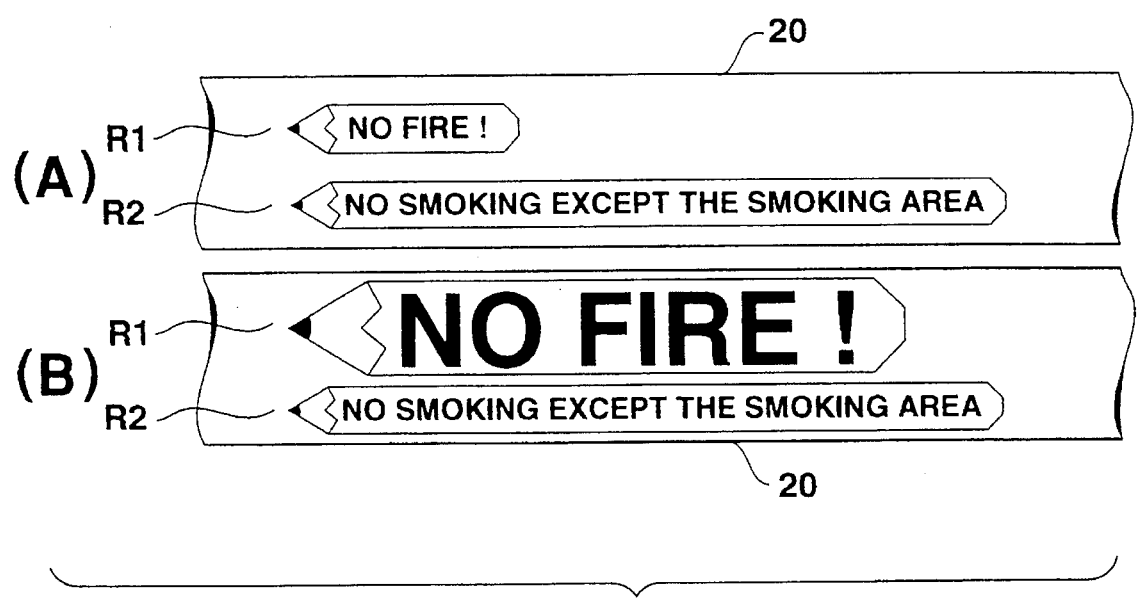
FIGS. 11A and 11B show print examples when character data items and frame data items are combined together and printed on the label printer of the second embodiment of the present invention.

After the development of dot patterns has finished, the control section 1 segments the developed data into each line of the heat elements of the printing section 6 and supplies these segmented data items to the printing section 6. The printing section 6 prints on the label tape 20 according to the print data supplied (step Q5). Accordingly, as shown at (A) and (B) in FIG. 11 in comparison with FIG. 5, "NO FIRE!" is printed on the first line R1 of the label tape 20 in a size three times as large in height and width as the basic print size, within a frame of a suitable size; and "NO SMOKING EXCEPT THE SMOKING AREA" is printed on the second line R2 of the label tape in a size once as large in height and width as the basic print size, within a frame of a suitable size.

Explained next will be the configuration of the tape width sensing section 7.

As shown in FIG. 12, the label tape 20, together with ink tape 21, is set in the tape cartridge 22. FIG. 12 is a view of the tape cartridge 22 with the top cover removed.

At the label printer mounting surface 23 of the tape cartridge 22, three projected portions 24, 25 and 26 are formed as shown in FIG. 13. On the other hand, at the tape cartridge mounting surface 13 of the label printer body 12, three recessed portions (small holes) 14, 15 and 16 are formed so as to coincide with the projected portions 24, 25 and 26. In the recessed portions 14, 15 and 16, microswitches 17, 18 and 19 are placed. The on/off signals from the microswitches 17, 18 and 19 are supplied to the tape width sensing section 7 (FIG. 1).

The projected portions 24 to 26 of the tape cartridge 22 housing a 6-mm-wide label tape 20 are formed long; the projected portion 24 of the tape cartridge 22 housing a 9-mm-wide label tape 20 is formed long and its projected portions 25 and 26 are formed short; the projected portion 25 of the tape cartridge 22 housing a 12-mm-wide label tape 20 is formed long and its projected portions 24 and 26 are formed short; the projected portions 24 and 25 of the tape cartridge 22 housing a 18-mm-wide label tape 20 are formed long and its projected portion 26 is formed short; and the projected portion 26 of the tape cartridge 22 housing a 24-mm-wide label tape 20 is formed long and its projected portions 24 and 25 are formed short.

With the tape cartridge 22 installed on the label printer body 12, the long projected portions turn on the microswitches 17 to 19, and the short projected portions keep them in the off state.

Therefore, when the tape cartridge 22 is not installed, all of the microswitches 17 to 19 are off. For example, when a tape cartridge 22 housing a 9-mm-wide label tape 20 is installed, microswitch 17 turns on, and microswitches 18 and 19 remain off; and when a tape cartridge 22 housing a 18-mm-wide label tape 20 is installed, microswitches 17 and 18 turn on, and microswitch 19 remains off. The tape width sensing section 7 decodes the on/off signals from the microswitches 17 to 19 and determines the width LB of the label tape 20 housed in the tape cartridge 22 installed.

The projected portions 24 to 26 may be combined arbitrarily, and their combinations are not limited to those in the embodiment. While in the embodiment, the type of the tape cartridge 22 installed is sensed from the on/off states of the microswitches 17 to 19, and the width LB of the label tape 20 housed in the cartridge is sensed indirectly, the width LB of label tape 20 may be sensed directly.

As described above, with the first and second embodiments, at least one format data that can be set is displayed according to the width LB of the label tape 20 installed on the label printer body 12 and the number of lines of print data. Just by selecting the desired one from these data format items, the format data item can be set. This avoids the problem of being unable to print the entered data on the label tape 20 installed. Furthermore, when the entered data is to be decorated with a frame, the frame can be set to a suitable size automatically.

The present invention is not restricted to the above embodiments. For instance, the form of the format select screen is not limited to those shown at (A) through (E) in FIG. 7. For instance, the magnification of characters for each line may be displayed directly so that the user can select a magnification (or a combination of magnifications). Furthermore, for instance, five patterns of the format select screen shown at (A) through (E) in FIG. 7 may be created previously and stored in a memory, and then these patterns may be read and displayed. In addition, a select screen may be created according to the format data set in the format storage section 8 on the basis of the width of label tape and the number of lines of entered data.

While in the above embodiment, the width of label tape and the number of lines of data are automatically sensed, they may be entered from the key input section 2. The present invention is not limited to the label printer, but may be applied to ordinary word processors and personal computers. The print data may be symbolic, numerical, or image data in addition to character data. The size of a printing medium includes its horizontal width and vertical width.

Hereinafter, a label printer according to a third embodiment of the present invention will be explained.

Figure 14:
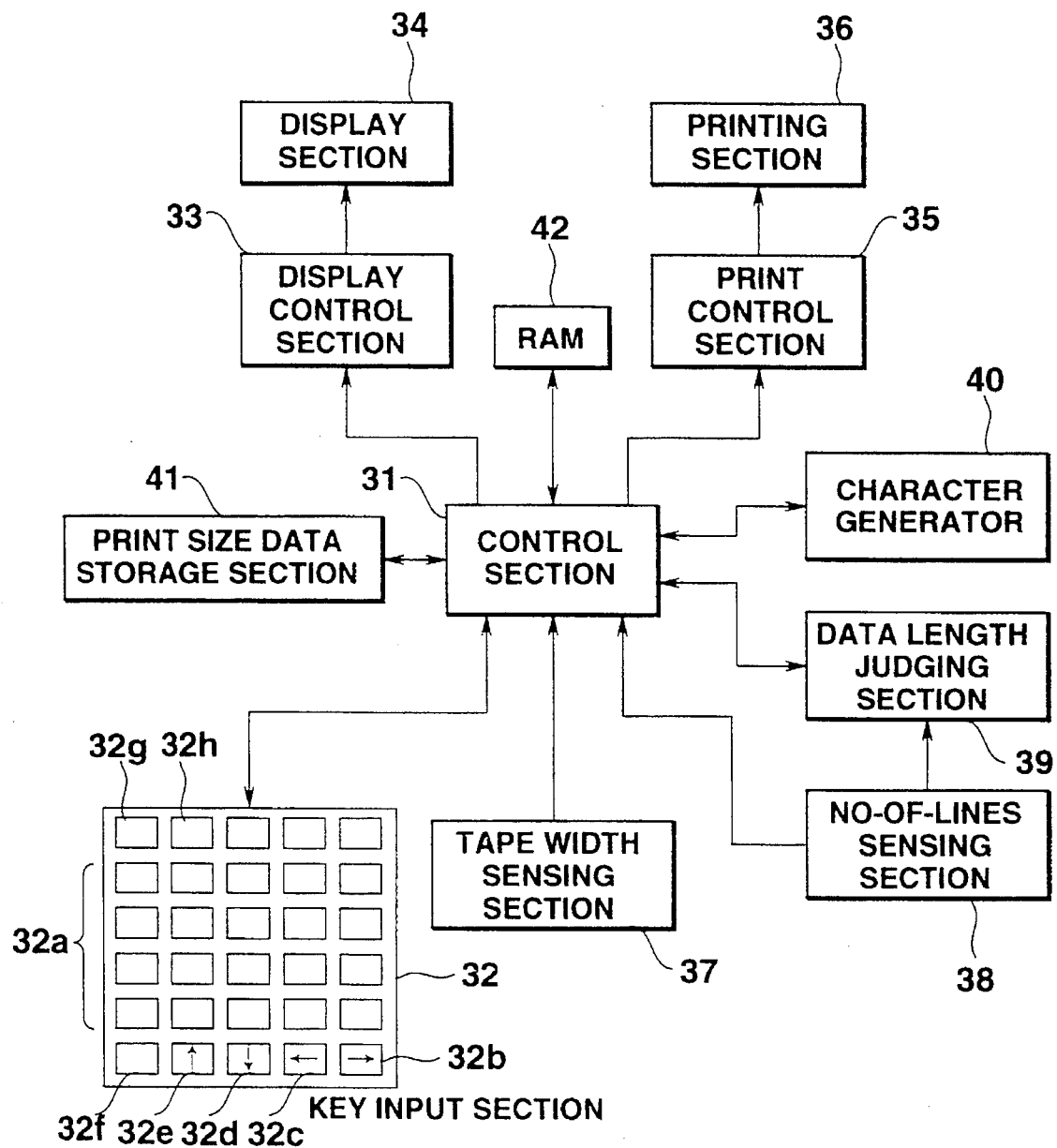
FIG. 14 is a block diagram of a label printer according to a third and a fourth embodiment of the present invention.
Figure 15:
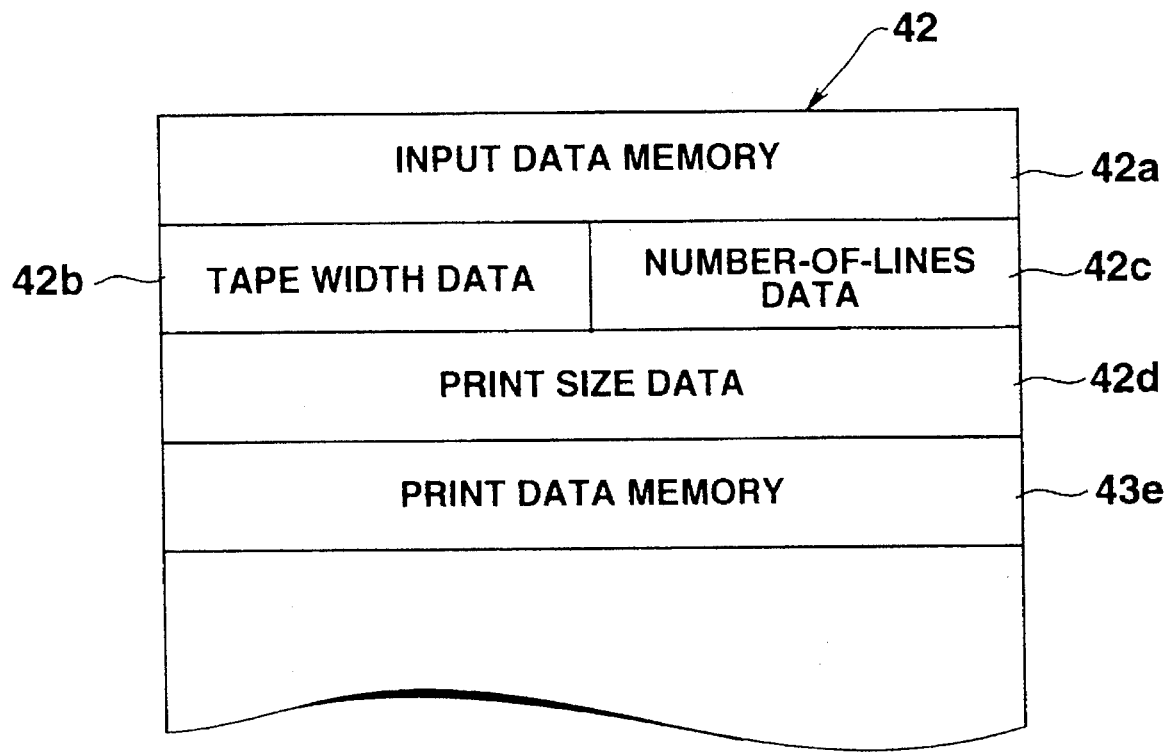
FIG. 15 shows the structure of the label printer RAM in the third and fourth embodiments of the present invention.

FIG. 14 is a block diagram of a label printer according to a third embodiment of the present invention.

As shown in FIG. 14, the label printer comprises a control section 31, a key input section 32, a display control section 33, a display section 34, a print control section 35, a printing section 36, a tape width sensing section 37, a number-of-lines sensing section 38, a data-length judging section 39 (used in a fourth embodiment explained later), a character generator 40, a print size data storage section 41, and a RAM 42.

The control section 31 includes a microprocessor, a program ROM, and its peripheral circuitry. It controls the entire operation of the label printer according to a control program.

The key input section 32 is provided with a keyboard, a keyboard interface, etc. It supplies input data to the control section 31. The keyboard includes character keys 32a, cursor keys 32b to 32e, a return key 32f, a print key 32g for specifying print, and a save key 32h for saving the created data.

The display control section 33 controls the display section 34 under the control of the control section 31.

The display section 34 is made up of a dot matrix liquid-crystal unit, for example. It displays print data, menus, etc.

The print control section 35 controls the printing section 36 under the control of the control section 31.

The printing section 36 is provided with a thermal head and a driving section for the thermal head, label tape, and an ink ribbon. It thermally drives each heat element of the thermal head under the control of the print control section 35, thereby printing on label tape, while transporting the label tape (a printing medium) and an ink ribbon.

The tape width sensing section 37 senses the width size of a label tape installed on the label printer body, and has the same construction as that of the tape width sensing section 7 in the block diagram (FIG. 1) of the first embodiment.

The mechanism of sensing the width size of a label tape is the same as that shown in FIGS. 12 and 13. The same mechanism is also used in the third embodiment.

The number-of-lines sensing section 38 senses the number of lines of the print data entered from the key input section 32 and stored in the RAM 42. The number of lines can be obtained by adding one to the number of new-line codes contained in the print data, for example.

The data-length judging section, which is used in a fourth embodiment explained later, judges the length of print data for each line.

The character generator 40 comprises a dot pattern memory for converting the entered data from the key input section 32 into display pattern data to be displayed on the display section 34 and also into print pattern data to be printed on the printing section 36.

The print size data storage section 41 stores data items for defining the size of each characters in the print data used in the third embodiment.

The RAM 42, which functions as a work memory of the control section 31, comprises an input data memory 42a for storing character data entered from the key input section 32 in the form of character codes, an area 42b for storing the width data on the label tape sensed at the tape width sensing section 37, an area 42c for storing data about the number of lines of character data (print data) entered from the key input section 32, an area 42d for storing the data items selected from the print size data storage section 42, a print data memory 42e for storing the print data to be supplied to the printing section 36 in the form of dot patterns, and a register (not shown) for the control section 31 to store the calculation results temporarily.

FIG. 16 shows a print size table stored in the print size data storage section 41. As shown in the figure, in the print size table, the size of each character in print data is defined by the width LB of label tape 20 and by the number of lines of print data. In FIG. 16, "A×A" means that characters are printed A times as large in height and width as the basic print size (the size of the basic font expressed as 1×1); and "reduction" means that characters are printed in a reduction size (nearly 0.7 times as large in height and width as the basic font).

According to the settings in FIG. 16, for example, with the width LB of label tape 20 being 18 mm, when the number of lines is one, each character is printed four times as large in height and width as the basic print size; when the number of lines is two, each character is printed twice as large in height and width as the basic print size; when the number of lines is three or four, each character is printed once as large in height and width as the basic print size; when the number of lines is any of five to eight, each character is printed in the reduction size; and when the number of lines is nine or more, printing cannot be effected.

Referring to the flowchart in FIG. 17, the procedure for creating labels with the label printer of the configuration described above will be described.

First, the user operates the key input section 32 to enter character strings (print data) to be printed. The procedure for entering characters and others are the same as with the conventional label printer. The control section 31 converts the entered characters into display character patterns using the character generator 40, displays the patterns on the display section 34 via the display control section 33, and also stores the patterns in the input data memory 42a of the RAM 42.

After the inputting of print data has finished, the user operates the print key 32g in the key input section 32. In response to the operation of the print key 32g, the control section 31 executes the processes shown in the flowchart of FIG. 17.

First, the control section 31 reads the width LB of the label tape 20 housed in the installed tape cartridge 22 from the tape width sensing section 37 and also stores it in the storage area 42b of the RAM 42 (step R1). Then, it judges whether or not the width LB of label tape 20 is zero, or whether or not the tape cartridge 22 is installed (step R2). If the tape cartridge 22 is not installed, the control section displays such a warning message as "Install a tape cartridge" on the display section 34 (step R3), and then terminates the printing process.

When the width LB of label tape 20 is any of 6, 9, 12, 18, and 24 mm, not 0 mm, the control section 31 reads the number of lines of print data from the number-of-lines sensing section 38 and also stores it in the storage area 42c of the RAM 42 (step R4). On the basis of the tape width LB and the number of lines stored in the RAM 42, the control section 31 accesses the print size table set in the first print size data storage section 41, reads the print size of each character, and also stores them in the storage area 42d of the RAM 42 (step R5).

When the character size is set in the relevant position of the print size table, the control section 31 judges that printing is possible (step R6), and develops the print data stored in the input data memory 42a of the RAM 42 into print patterns (dot patterns) using the character generator 40. Furthermore, on the basis of the data stored in the storage area 42d of the RAM 42, the control section 31, if necessary, enlarges or reduces each character to a size set in the print size table, and stores the developed print pattern data in the print data memory 42e of the RAM 42 (step R7).

Then, the control section 31 segments the print data pattern data stored in the print data memory 42e of the RAM 42 into lines of the print head, and supplies them to the print control section 35. The print control section 35 controls the print section 36 to print the print pattern data (step R8).

When "too many lines" is set in the relevant position of the print size table, the control section judges at step R6 that printing is impossible, displays the warning message "Printing cannot be effected because of too many lines" (step R9), and terminates the printing process. The user replaces the tape cartridge 22 with that with wider label tape 20, or modifies the number of print lines, and then starts the printing process again.

For instance, assume that the user enters the print data "NO FIRE!" and print it. In this case, because the print data does not contain a new line code, it is determined to be a line of data. Therefore, when the width LB of label tape 20 is 6 mm, each character is printed in the basic print size; when 9 mm, each character is printed twice as large in height and width as the basic print size; when 12 mm, each character is printed three times as large in height and width as the basic print size; when 18 mm, each character is printed four times as large in height and width as the basic print size as shown at (A) in FIG. 18; and when 24 mm, each character is printed five times as large in height and width as the basic print size.

Similarly, for instance, when the user enters "NO FIRE! (new line) NO SMOKING EXCEPT THE SMOKING AREA," two lines of print data, and prints these, the print data can be determined to be two lines of data because the print data contains one new line code. When the width LB of label tape 20 is 6 mm, each character is printed in the reduction size; when the width LB of the label tape 20 is 9 or 12 mm, each character is printed in the basic print size; when 18 mm, each character is printed twice as large in height and width as the basic print size as shown at (B) in FIG. 18; and when 24 mm, too, each character is printed twice as large in height and width as the basic print size.

That is, each character is printed in the maximum size that can be set according to the width LB of label tape 20 and the number of print lines.

Figure 18:
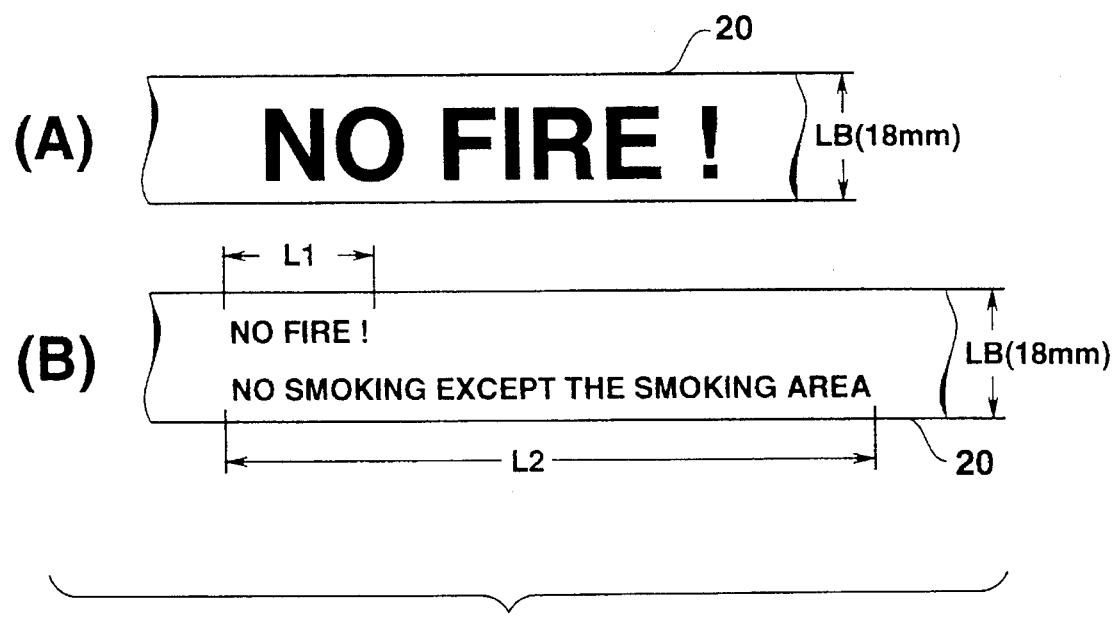
FIGS. 18A and 18B show examples of print made on label tape by the label printer of the third embodiment of the present invention.
Figure 19:
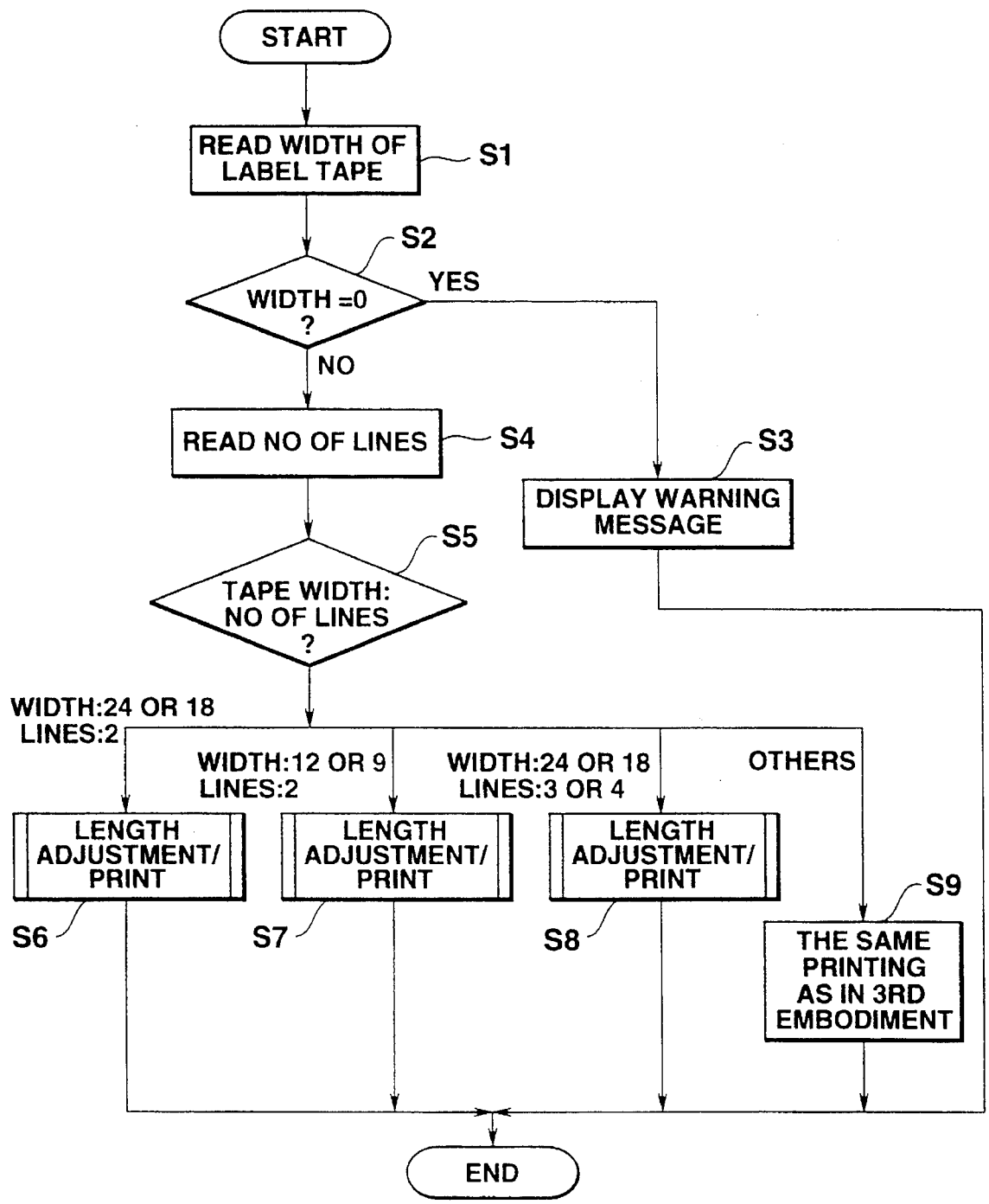
FIG. 19 is a flowchart to help explain the operation of the label printer in the fourth embodiment of the present invention.

As shown at (A) and (B) in FIG. 18, with the embodiment, the print data is printed on the label tape 20 in well-balanced form according to the number of lines of print data and the width of label tape 20.

Furthermore, legible print can be produced because the maximum character size is automatically set in the range that allows all lines of the print data to be printed on the label tape 20.

Figure 17:
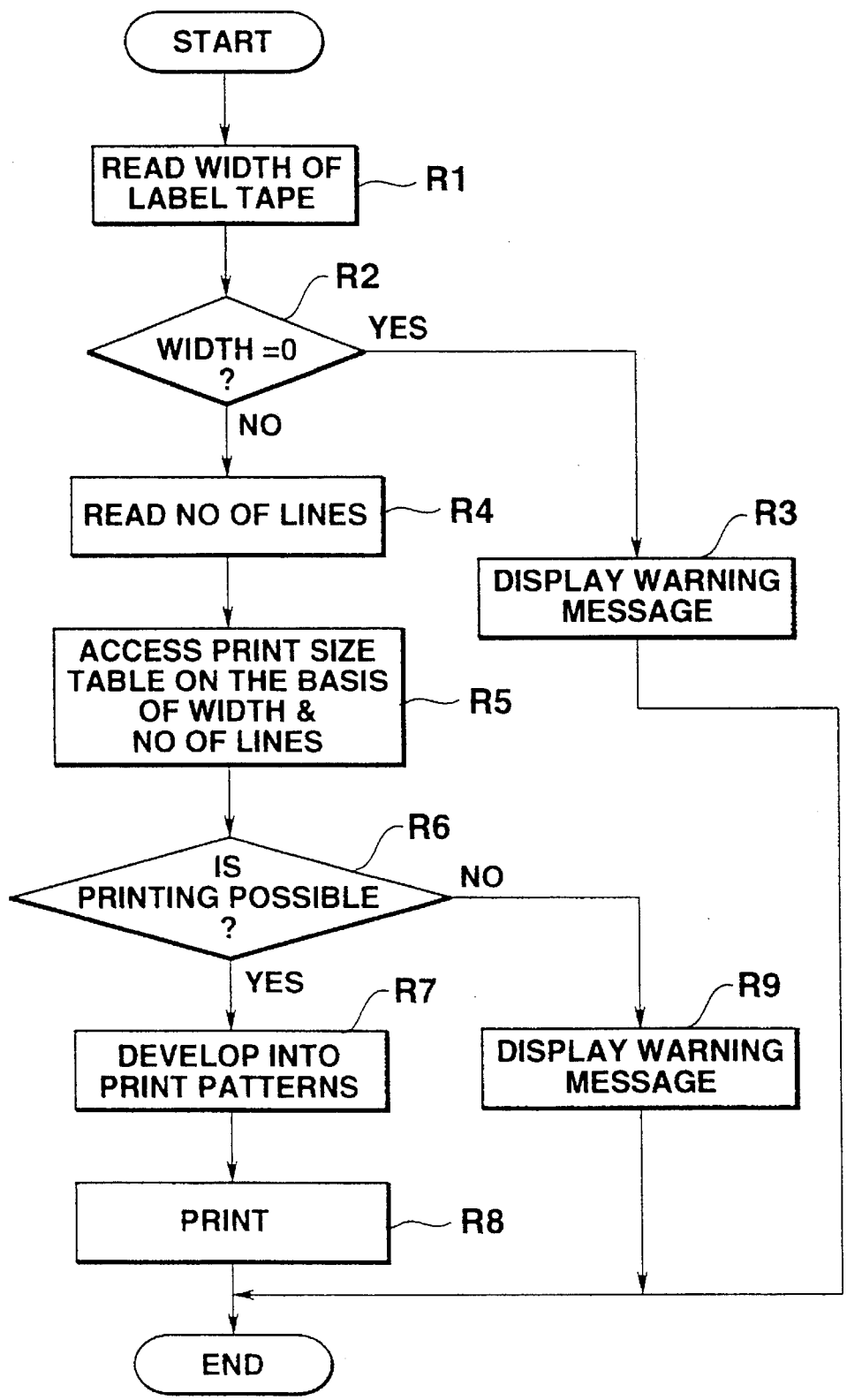
FIG. 17 is a flowchart to help explain the operation of the label printer in the third embodiment of the present invention.

In the embodiment, for example, before the process of FIG. 17 is started, a screen asking the user if he or her wants to select automatic setting of character size (the process of FIG. 17) or individual setting may be displayed on the display section 34 so that the process of FIG. 17 may be started according to the selection of the user. In addition, before the print pattern is developed, an acknowledge message such as "Each character is going to be printed in size A×A. OK ?" may be displayed, for example.

Hereinafter, a fourth embodiment of the present invention will be explained.

With the third embodiment, the size of each character is determined, taking into account the width LB of label tape 20 and the balance across the width of the print data. In this approach, however, when the number of print lines is plural, length L1 can differ significantly from length L2 as shown at (B) in FIG. 18. To avoid this problem, in the fourth embodiment, the size of each character is determined, taking into account not only the width LB of label tape 20 and the number of lines of print data, but also the length of print data.

A label printer associated with this embodiment has the same configuration as that shown in FIG. 14. In FIG. 14, a data length judging section 39, when the print data has more than one line, judges the length of each line (the length of each line after printing has been effected in the basic print size).

Hereinafter, the operation of the label printer according to the fourth embodiment will be described, referring to FIGS. 19 to 23. The input operation in this embodiment is the same as that in the first embodiment.

After the inputting of print data has finished, the user operates the print key in the key input section 32. In response to the key operation, the control section 31 starts the processes shown in the flowchart of FIG. 19.

First, the control section 31 reads the width LB of label tape 20 from the tape width sensing section 37 (step S1). Then, it judges whether or not the read-out width LB is zero (step S2). If the width LB is zero, it displays a warning message as in the third embodiment (step S3), and terminates the printing process.

When the width LB is any value other than zero, the control section 31 reads the number of lines from the number-of-lines sensing section 38 (step S4). Then, it determines the width LB of label tape 20 and the number of lines of print data (step S5), and executes the print process according to a combination of the width LB and the number of lines (step S6 to S9).

Figure 20:
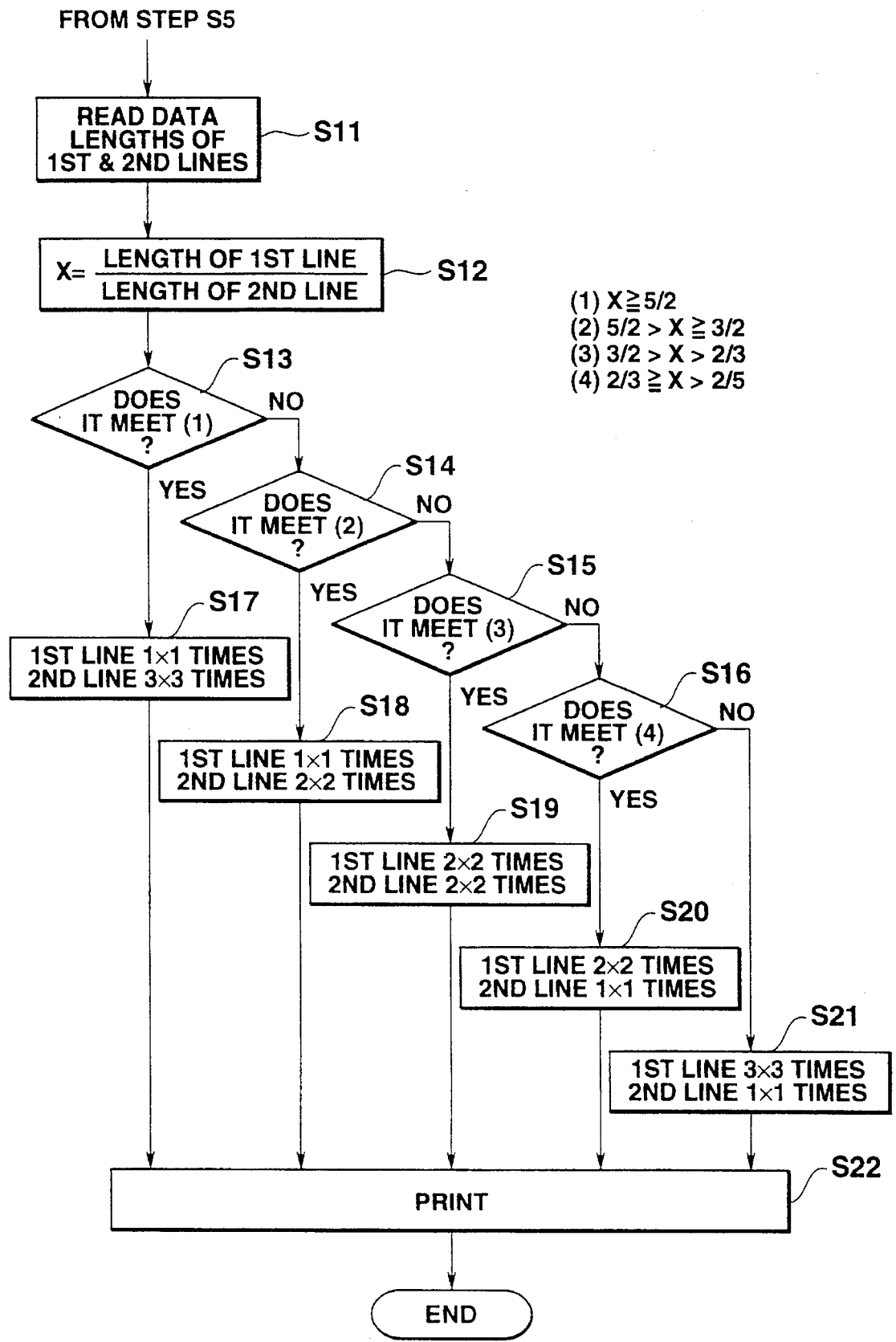
FIG. 20 is a flowchart to help explain the adjustment of the length of each line, the creation of print data, and printing when printing is effected on the label printer of the fourth embodiment of the present invention.
Figure 21:
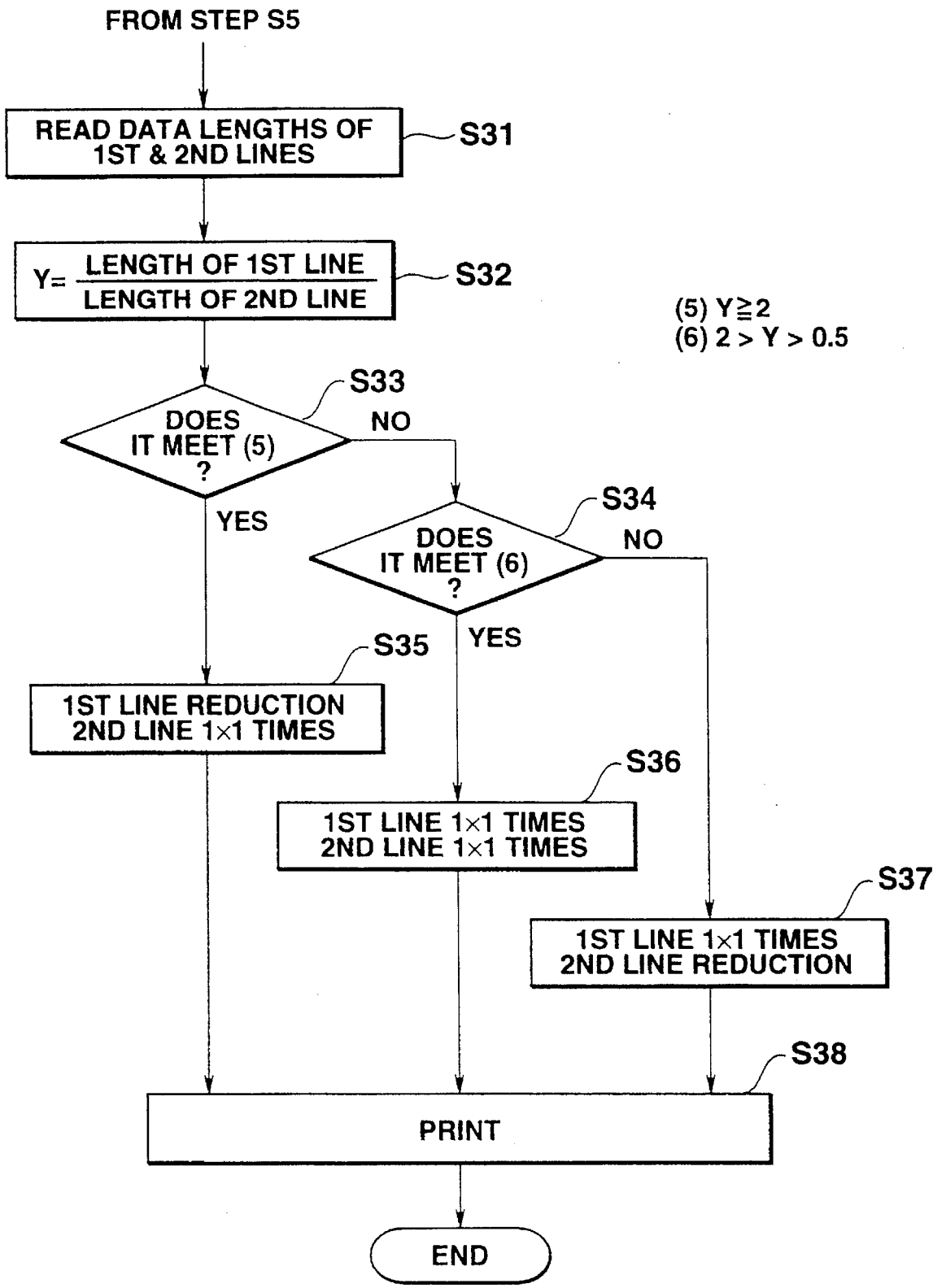
FIG. 21 is a flowchart to help explain the adjustment of the length of each line, the creation of print data, and printing when printing is effected on the label printer of the fourth embodiment of the present invention.
Figure 22:
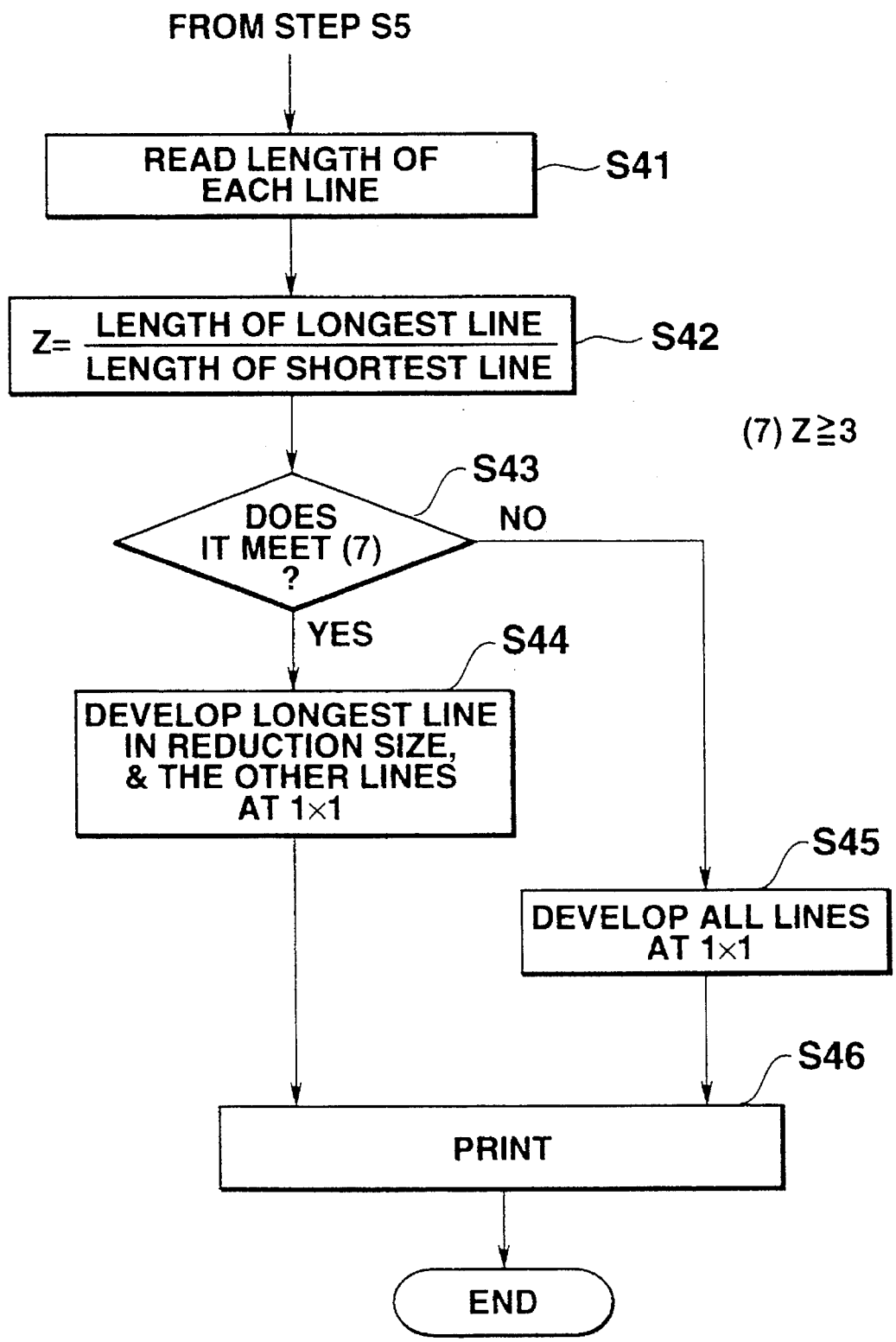
FIG. 22 is a flowchart to help explain the adjustment of the length of each line, the creation of print data, and printing when printing is effected on the label printer of the fourth embodiment of the present invention.

Referring to FIGS. 20 to 22, the printing processes executed at steps S6 to S9 will be explained.

First, when the width LB of label tape 20 is 24 mm or 18 mm and the number of lines of print data is 2, the processing in FIG. 20 is effected.

First, the control section 31 accesses the data length judging section 39, reads the lengths of the first and second lines of print data (the lengths when they are printed in the basic print size) (step S11), and finds the quotient X by dividing the length of the first line by that of the second line (step S12).

Next, it is determined at steps S13 to S16 which one of equations (1) to (4) in FIG. 20 is fulfilled by quotient X.

When quotient X meets equation (1), or when the first line is equal to or more than 2.5 times as long as the second line, control proceeds to step S17, where each character in the first line is enlarged 1×1 times as large and each character in the second line is enlarged 3×3 times as large, and they are printed (step S22).

When quotient X fulfills equation (2), or when the first line is less than 2.5 times as long as the second line and equal to or more than 1.5 times as long as the second line, control goes to step S18, where each character in the first line is enlarged 1×1 times as large and each character in the second line is enlarged 2×2 times as large, and they are printed (step S22).

When quotient X fulfills equation (3), or when the first line are 1.5 to 0.66 times as long as the second line, control goes to step S19, where each character in the first and second lines is enlarged 2×2 times as large, and they are printed (step S22).

When quotient X meets equation (4), or when the first line is less than 0.66 times as long as the second line and more than 0.4 times as long as the second line, control proceeds to step S20, where each character in the first line is enlarged 2×2 times as large and each character in the second line is enlarged 1×1 times as large, and they are printed (step S22).

When quotient X meets none of the equations, or when the first line is equal to or less than 0.4 times as long as the second line, control proceeds to step S21, where each character in the first line is enlarged 3×3 times as large and each character in the second line is enlarged 1×1 times as large, and they are printed (step S22).

When the width LB of label tape 20 is 9 mm or 12 mm and the number of lines of print data is 2, the control section 31 executes the processing in FIG. 21.

First, the control section 31 accesses the data length judging section 39, reads the lengths of the first and second lines of print data (steps S31), and finds the quotient Y by dividing the length of the first line by that of the second line (step S32).

Next, at steps S33 and S34, the control section 31 determines which one of equations (5) and (6) in FIG. 21 is fulfilled by quotient Y.

When quotient Y meets equation (5), or when the first line is equal to or more than twice as long as the second line, control proceeds to step S35, where each character in the first line is developed in the reduction size, and each character in the second line is developed in a size of 1×1 times, and they are printed (step S38).

When quotient Y fulfills equation (6), or when the first line is less than twice as long as the second line and more than 0.5 times as long as the second line, control goes to step S36, where each character in the first and the second line is developed in a size of 1×1 times, and they are printed (step S38).

When quotient Y meets none of the equations, or when the first line is less than 0.5 times as long as the second line, control proceeds to step S37, where each character in the first line is developed in a size of 1×1 times and each character in the second line is developed in the reduction size, and they are printed (step S38).

When the width LB of label tape 20 is 24 mm or 18 mm and the number of lines of print data is 3 or 4, the control section 31 executes the processing in FIG. 22.

First, the control section 31 accesses the data length judging section 39, reads the length of each line of print data (steps S41), and finds the quotient Z by dividing the length of the longest line by that of the shortest line (step S42).

Next, at step S43, the control section 31 determines whether or not quotient Z fulfills equation (7) of FIG. 22.

When quotient Z meets equation (7), or when the longest line is equal to or more than 3 times as long as the shortest line, the longest line is developed in the reduction size, and the other lines are developed in a size of 1×1 times (step S44), and they are printed (step S46).

When quotient Z does not satisfy equation (7), or when the longest line is less than three times as long as the shortest line, all lines are developed in a size of 1×1 times (step S45), and they are printed (step S46).

Use of such a printing method alleviates the imbalance between the longest line and the shortest line, thereby producing a well-balanced print.

For instance, when the user enters "NO FIRE! (new line) NO SMOKING EXCEPT THE SMOKING AREA," two lines of print data, and prints these in the same character size, the first line has a length of seven characters and the second line has a length of 29 characters, and therefore their print looks unbalanced.

With the embodiment, for instance, when the width LB of label tape 20 is determined to be 24 mm or 18 mm, quotient X satisfies equation (4). As a result, as shown in FIG. 23, "NO FIRE!" is printed on the first line in a size three times as large in height and width, and "NO SMOKING EXCEPT THE SMOKING AREA" on the second line in a size once as large in height and width.

Figure 23:
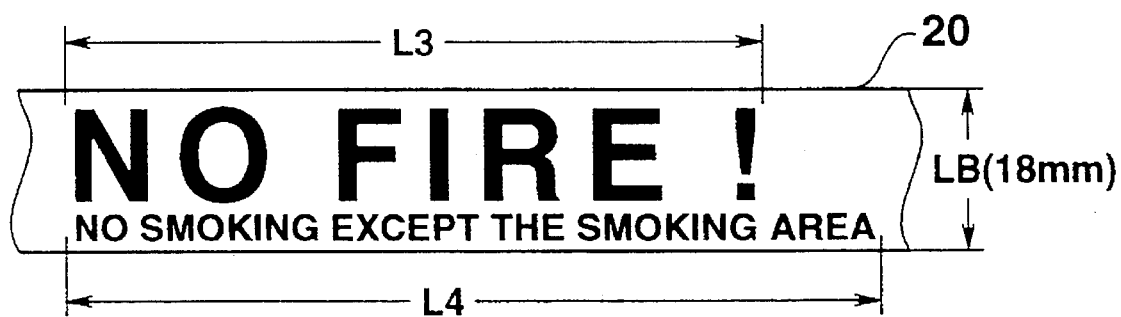
FIG. 23 shows an example of print made on label tape by the label printer of the fourth embodiment of the present invention.

As seen from the comparison shown at (B) of FIG. 18 with FIG. 23, the embodiment can make length L3 and length L4 of the individual lines equal or approximate to each other, thereby improving the balance between lengths L3 and L4 of the lines.

The judgment criteria and the print size of each character in FIGS. 20 to 22 are illustrative and not restrictive. For instance, only when the number of lines is two and the width of label tape is 18 mm or 24 mm, the print length may be adjusted, and for the other number of lines and the other widths, printing may be done according to the contents of the print size table shown in FIG. 16. The magnifications of characters are not limited to those in the above embodiments. The space between characters may be adjusted to adjust the print length of each line.

While in the fourth embodiment, the character size is modified by comparing the longest line with the shortest line, it may be modified by, for example, calculating the average of the individual lines and comparing the average with the longest and shortest lines. In addition, other suitable modifying methods may be used.

A detailed explanation of the mechanism for sensing the width LB of label tape 20 will be omitted here, because it has been described in the first and second embodiments using FIGS. 12 and 13.

While in the third and fourth embodiments, the invention has been applied to the label printer, it is not limited to the label printer. For instance, the invention may be applied to ordinary word processors or personal computers. Furthermore, the invention is not restricted to an apparatus provided with a printing section. For instance, it may be applied to an apparatus without a printing section which carries out the print processing as far as creating print pattern data (printing will be done with a separate unit). A similar method may be used for display, not limited to printing. In addition to character data, the print data may be other symbols, numerals, or image data.

Hereinafter, a fifth embodiment of the present invention will be explained.

Figure 24:
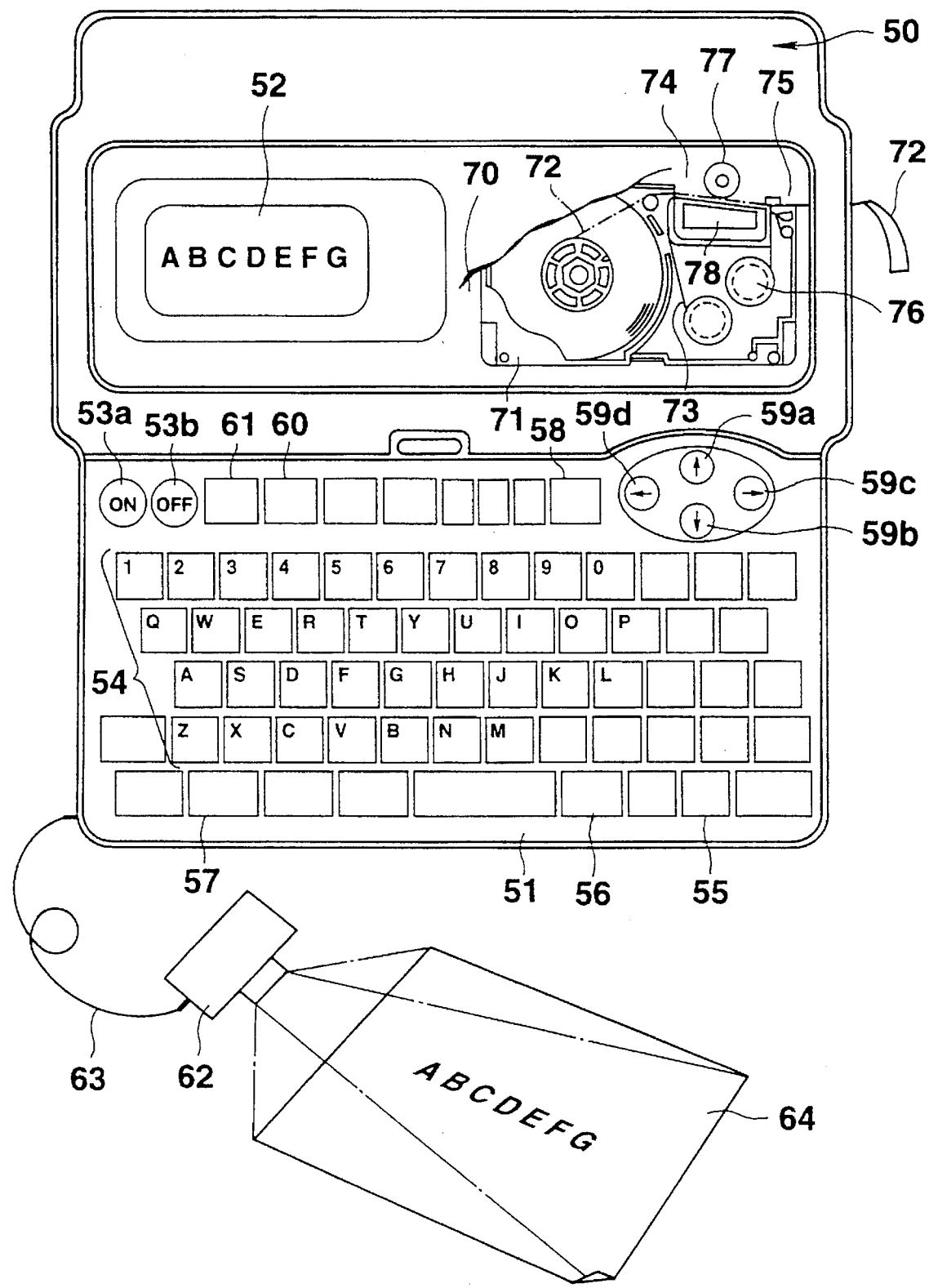
FIG. 24 is an outer view of a label printer according to a fifth embodiment of the present invention.

FIG. 24 is an outer view of a label printer according to the fifth embodiment of the present invention.

A key input section 51 and a liquid-crystal dot matrix display section 52 are provided on the front of a printer body 50. The key input section 51 is provided with an ON key 53a and OFF key 53b for turning the power on and off, various character symbol input keys 54 for entering alphanumeric characters and symbols, an aA key 55 for setting the English-letter input mode, a space key 56 for entering a space, a cancel key 57 for canceling the contents of the preceding process in each mode, a print key 58 for starting a print process, cursor keys 59a, 59b, 59c and 59d for performing a screen scroll operation, a cursor move operation, or a data select operation on the liquid-crystal display section 52, a mode key 60 for setting the image data input mode, the character data input mode, or the print mode, and a zoom key 61 for enlarging and displaying the print data displayed on the liquid-crystal display section 52 in the print mode.

The key input section 51 is also provided with various function keys that are used in creating and displaying print data, as needed.

The printer body 50 is provided detachably with a CCD camera 62 via an image bus 63. In the image data input mode, for example, the image data "ABCDEFG" drawn on a manuscript 64 is entered as print data and displayed on the liquid-crystal display section 52.

Specifically, for example, in the image data input mode, when the user wants to print the image data "ABCDEFG" entered from the CCD camera 62 on label tape, he or her sets the print mode and operates the print key 58 in combination with the 1 key. This allows the image data "ABCDEFG" to be printed on label tape 72, which is then outputted.

Furthermore, when the user wants to enter "ABC" and print it on label tape in the character data input mode, he or her operates the character symbol input keys 54 to enter "A", "B", and "C". Then, "ABC" is displayed sequentially on the liquid-crystal display section 52.

Then, when the user sets the print mode, and operates the print key 58 in combination with the 1 key, the input character string "ABC" is printed on the label tape 72.

Here, when the user operates the print key 58 in combination with the 1 key, all of the image data and character data entered as display data are printed. Additionally, when the user operates the print key 58 in combination with the 2 key, of the image data and character data entered as display data, only the data displayed on the liquid-crystal display section 52 by the display enlarge process or the screen scroll process is printed.

In this case, whether the print process is triggered by a combination of the print key and the 1 key or by a combination of the print key and the 2 key, printing is done on the label tape 72. The print data is printed in a size corresponding to the ratio of the size of the display area of the liquid-crystal display section 52 to the size of print data displayed therein.

Inside the printer body 50 adjacent to the liquid-crystal dot matrix display section 52, a cassette mounting section 70 is provided as shown in the figure with portions broken away. In the cassette mounting section 70, an ink tape cassette 71 is installed.

The ink tape cassette 71 contains a label tape 72 with adhesive on which print data is to be printed and an ink ribbon 73 for printing on the label tape 72. The label tape 72 is designed to be in parallel contact with the ink ribbon 73 and advance together with the latter simultaneously at a transfer section 74 and then to be discharged from a tape discharge section 75.

By removing the back cover (not shown) from the printer body 50 provided with the key input section 51 and the liquid-crystal display section 52, the ink tape cassette 71 can be installed and removed in and from the cassette mounting section 70. A ribbon take-up spool 76 placed in the ink tape cassette 71 is rotated by a tape motor (not shown). As the ink ribbon 73 is wound up, the label tape in contact with the ink ribbon is also drawn out simultaneously.

In this case, a platen roller 77 is positioned along the label tape 72 in the transfer section 74 of the ink tape cassette 71. A thermal head 78 is positioned along the ink ribbon 73 in the transfer section 74.

Specifically, when print data is printed on the label tape 72 with adhesive, the label tape 72 and ink ribbon 73 are conveyed in the transfer section 74 at the same speed by the rotation of the ribbon take-up spool 76 and platen roller 77. The thermal head 78 presses the label tape 72 and ink ribbon 73 against the platen roller 77 and effects a heat transfer operation, thereby printing the print data on the label tape 72 sequentially. The printed tape is let out of the tape discharge section 75, thereby allowing the printed portion to be discharged outside the printer body 50.

Figure 25:
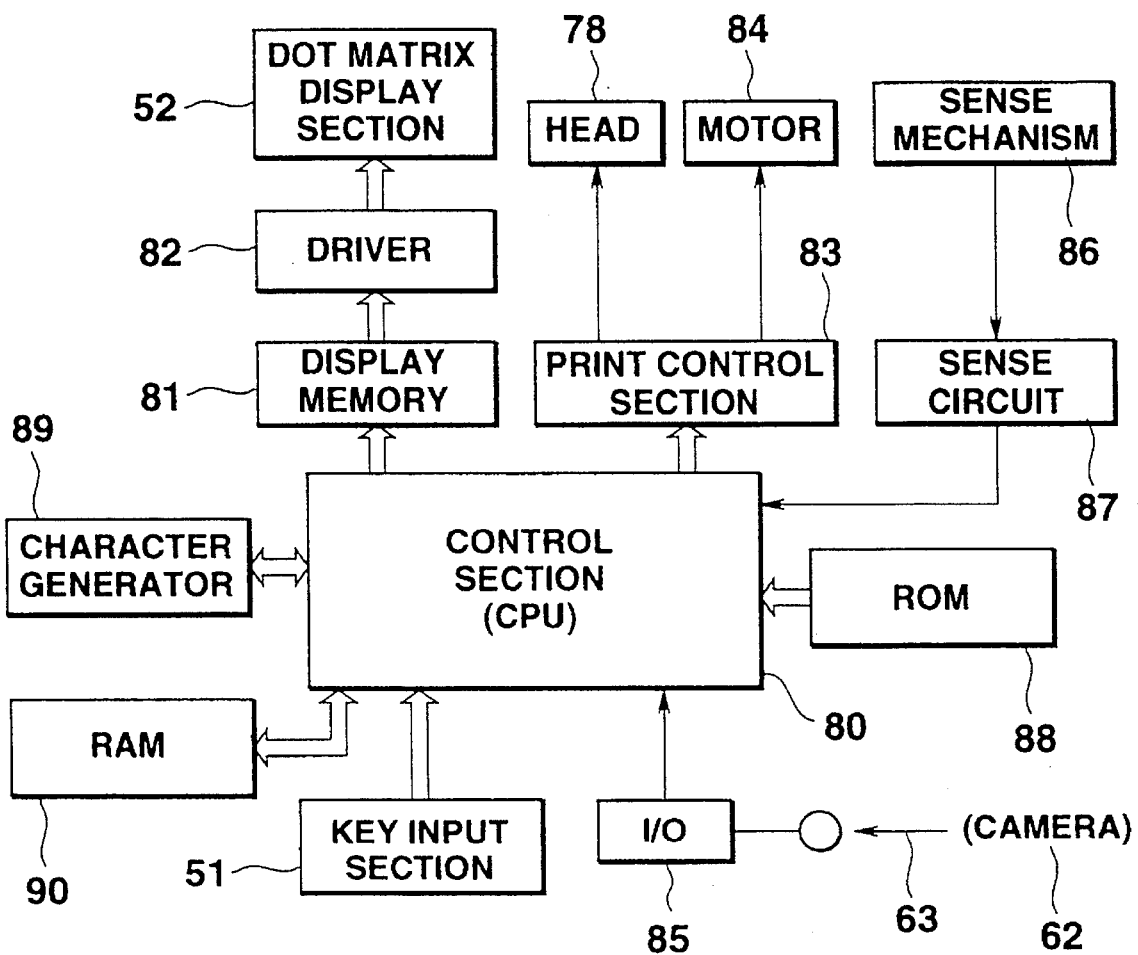
FIG. 25 is a block diagram of the electronic circuitry of the label printer according to the fifth embodiment of the present invention.

FIG. 25 is a block diagram of the electronic circuitry of the label printer.

The entire operation of the electronic circuitry of the label printer is controlled by a control section (CPU) 80.

Connected to the control section 80 are the key input section 51, a liquid-crystal dot matrix display section 52 via a display memory 81 and a display driver 82, a thermal head 78 and a tape transport motor 84 via a print control section 83, and a CCD camera 62 via an input/output control section (I/O) 85.

Further connected to the control section 80 are a tape sensing mechanism 86 for sensing the width of label tape via a sensing circuit 87, a ROM 88, a character generator 89, and a RAM 90.

The ROM 88 previously stores a system control program for the control section 80, including a print data create control program or a print control program.

The character generator 89 previously stores the character pattern data items corresponding to all characters, symbols, and instruction codes that can be entered from the key input section 51.

Figure 26:
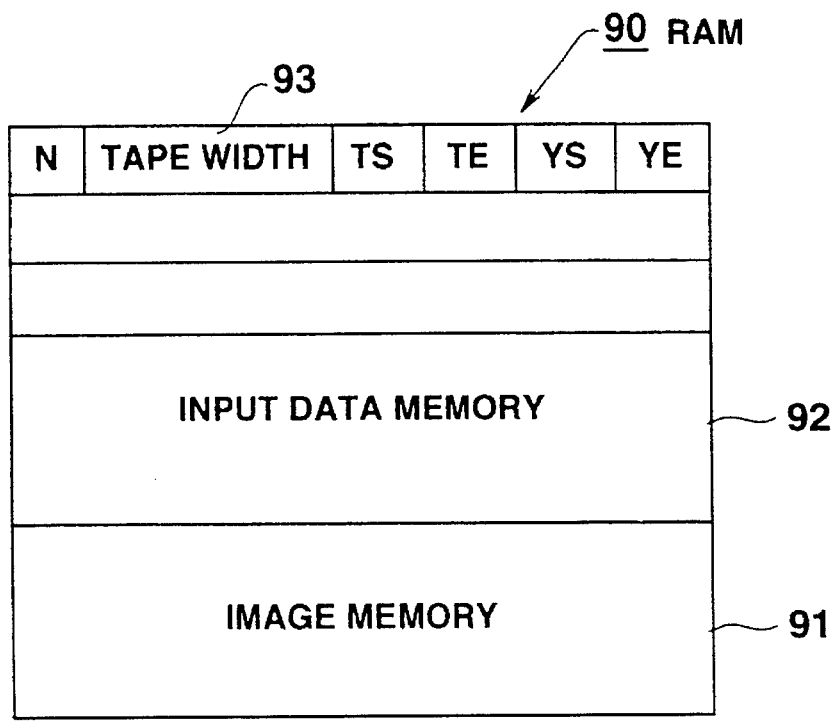
FIG. 26 shows how data is stored in the RAM provided in the electronic circuitry of the label printer according to the fifth embodiment of the present invention.

FIG. 26 shows a state where data items are stored in the RAM 90 in the electronic circuitry of the label printer.

The RAM 90 contains: an image memory 91 for storing image data and character data entered in the image data input mode or the character input mode, as print data in bit map form, a print data memory 92 for storing the print data stored in the image memory 91 so as to correspond to the actual print area set according to a combination of the print key and the 1 key or of the print key and the 2 key, an N register in which "1" is set in the image data input mode, the character data input mode, or the print mode, and "0" is set in the format setting mode for print formats etc., a TS register for indicating the start coordinate in the vertical direction on the image memory 91 for the area displayed on the liquid-crystal display section 52, a TE register for indicating the end coordinate in the vertical direction, a YS register for indicating the start coordinate in the horizontal direction, a YE register for indicating the end coordinate in the horizontal direction, and a tape width register 93 in which the width of label tape 72 sensed at the tape sensing mechanism 86 via the sensing circuit 87 is written.

Figure 27:
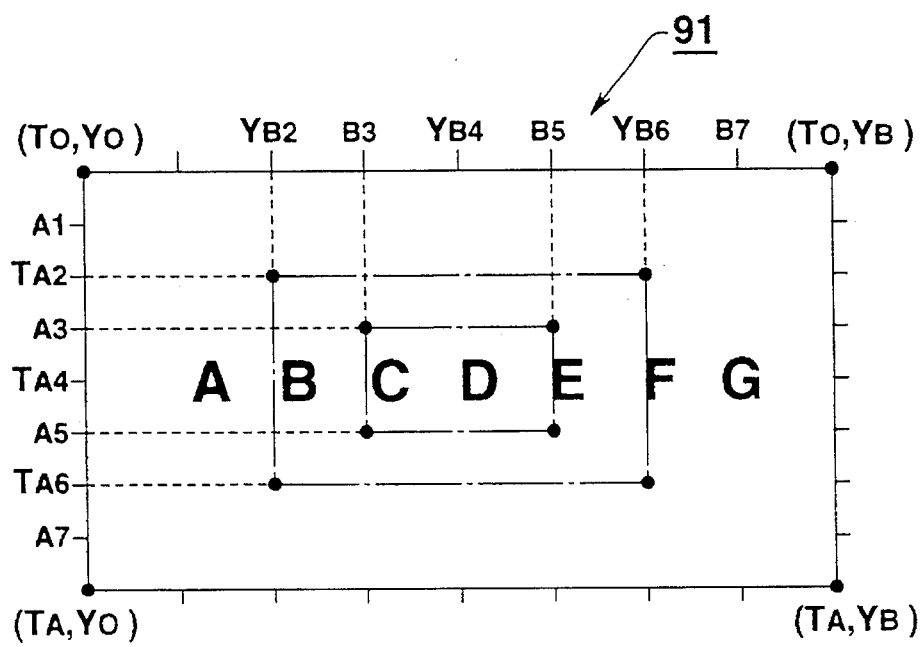
FIG. 27 shows how data is stored in the image memory provided in the RAM of the label printer according to the fifth embodiment of the present invention.

FIG. 27 shows a state in which data items are stored in the image memory 91 of the RAM 90 of the label printer.

Coordinates of the image storage area of the image memory 91 are set in the ranges from $T_0$ to $T_A$ in the vertical direction and from $Y_0$ to $Y_B$ in the horizontal direction, and are expressed as $(T_0, Y_0)$ to $(T_A, Y_B)$. For instance, when the entire area of the image memory 91 is transferred as display data to the display memory 81 and displayed on the liquid-crystal display section 52, $(T_0)$ is set in the TS register, $(T_A)$ in the TE register, $(Y_0)$ in the YS register, and $(Y_B)$ in the YE register. As a result, the entire memory area enclosed by $(T_0, Y_0)$ $(T_A, Y_0)$ $(T_0, Y_B)$ $(T_A, Y_B)$ is displayed as display data.

In synchronization with the operation that the print data read from the print data memory 92 in response to the start of printing caused by operating the print key in combination with the 1 key or the 2 key is printed on label tape 72 by the thermal head 78, the print control section 83 drives the tape transport motor 84 to rotate the ribbon take-up spool 76. This causes the label tape 72 to be let out of the ink tape cassette 71 as the printing is effected.

Hereinafter, the operation of the label printer thus constructed will be explained.

The above-described label printer can print on the label tape 72 either the character data entered from the character symbol input key 54 in the key input section 51 in the character data input mode or the image data supplied from a CCD camera 62 via the input/output control section (I/O) 85 in the image data input mode, as desired. However, explained here will be a case where the image data created by photography in the image data input mode is printed on label tape.

First, the CCD camera 62 is connected to the printer body 50 via an image bus 63. After the mode key 60 in the key input section 51 is operated to set the image data input mode, the image of a manuscript 64 on which, for example, "ABCDEFG" is written is supplied from the CCD camera 62 via the input/output control section (I/O) 85. The image data of the manuscript 64 including "ABCDEFG" is stored in the entire area of the image memory 91 of the RAM 90.

Figure 28:
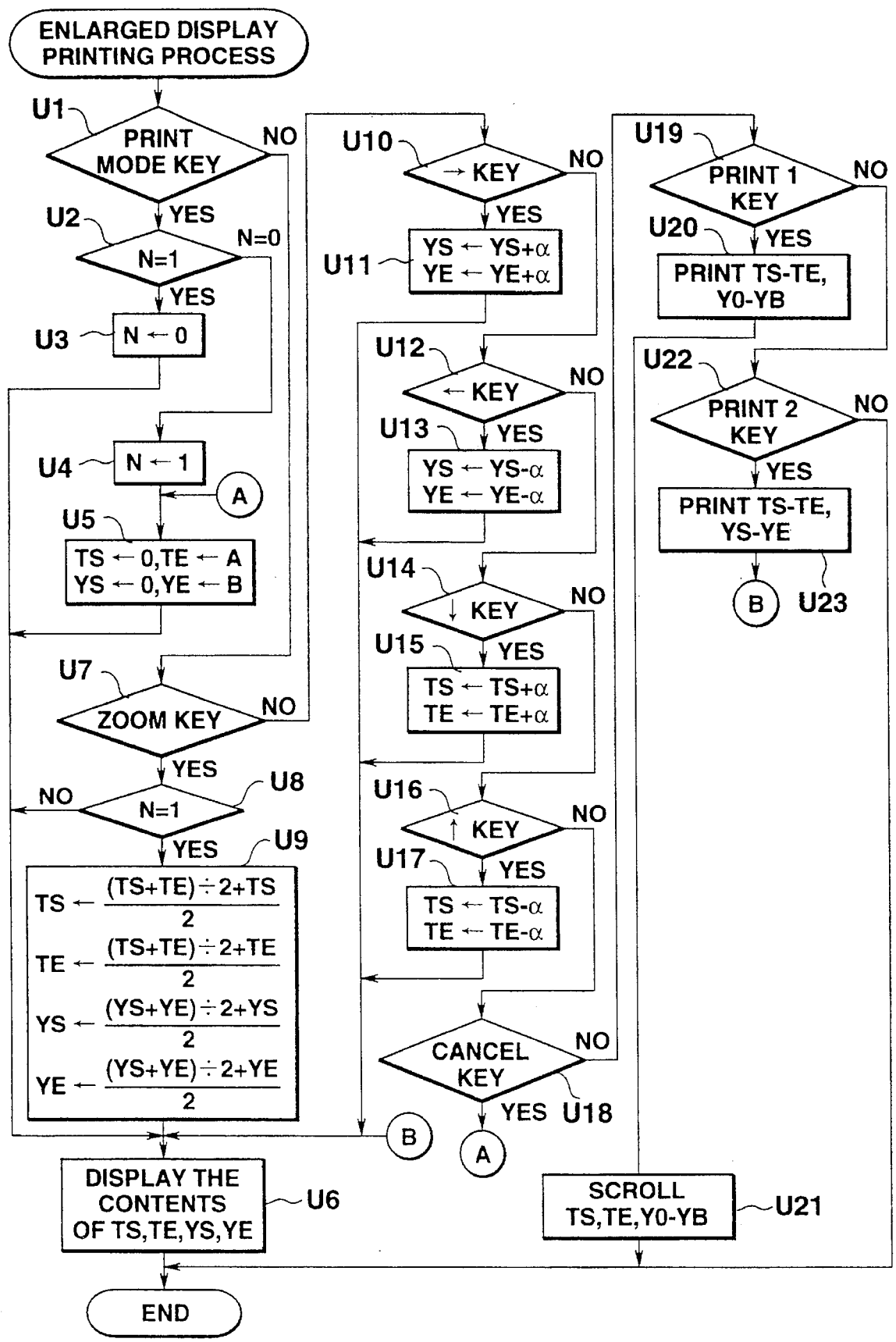
FIG. 28 is a flowchart for an enlarged display printing process by the label printer of the fifth embodiment of the present invention.

FIG. 28 is a flowchart for the enlarged display printing process by the label printer.

FIG. 29 shows a state where print data is displayed after the enlarged display printing process by the label printer and a state where the same print data is printed on label tape.

Specifically, with the image data of the manuscript 64 stored in the image memory 91, the mode key 60 is operated. Then, when "1" is set in N register of RAM 90, or when the print mode is already on, "0" is set in N register to switch to the format setting mode (step U1→U2→U3).

If "0" is set in N register when the mode key 60 is operated, or if the format setting mode is already on, "1" is set in N register to switch to the print mode (step U1→U2→U4).

Then, "0" is set in TS register of RAM 90, "A" in TE register, "0" in YS register, and "B" in YE register. The entire area of the image memory 91 is read as display data and transferred to the display memory 81, which stores it. Then, as shown at (A) in FIG. 29, the entire image data enclosed by four coordinates $(T_0, Y_0)$ $(T_A, Y_0)$ $(T_0, Y_B)$ $(T_A, Y_B)$ indicated by the TS, TE, YS, and YE registers of the image memory 91, is displayed on the liquid display section 52 (steps U5 and U6).

As shown at (A) in FIG. 29, with the image data corresponding to the entire area $(T_0, Y_0)$ $(T_A, Y_0)$ $(T_0, Y_B)$ $(T_A, Y_B)$ of the image memory 91 being displayed on the liquid-crystal display section 52, when the zoom key 61 is operated, it is judged that "1" is set in N register, or that the print mode is on. Thereafter, an enlarging process is effected by coordinate transformation of the displayed area according to the following equations (a) to (d) (step U1→U7→U8→U9):

$$TS \to \{(TS+TE)+2+TS\}/2 \quad (a)$$

$$TE \to \{(TS+TE)+2+TE\}/2 \quad (b)$$

$$YS \to \{(YS+YE)+2+YS\}/2 \quad (c)$$

$$YE \to \{(YS+YE)+2+YE\}/2 \quad (d)$$

Specifically, when the zoom key 61 is operated, as shown in FIG. 27, "$T_{A2}$" is set in TS register as the vertical start coordinate of the image memory 91 for transformation, "$T_{A6}$" in TE register as the vertical end coordinate, "$Y_{B2}$" in YS register as the horizontal start coordinate, and "$Y_{B6}$" in YE register as the horizontal end coordinate. In this case, as shown at (C) in FIG. 29, the image data enclosed by four coordinates $(T_{A2}, Y_{B2})$ $(T_{A6}, Y_{B2})$ $(T_{A2}, Y_{B6})$ $(T_{A6}, Y_{B6})$ of the image memory 91 is transferred to the entire area of the display memory 81, which stores it, thereby displaying the enlarged image on the liquid-crystal display section 52 (steps U9 and U6).

Furthermore, as shown at (C) in FIG. 29, with the image data corresponding to four coordinates $(T_{A2}, Y_{B2})$ $(T_{A6}, Y_{B2})$ $(T_{A2}, Y_{B6})$ $(T_{A6}, Y_{B6})$ of the image memory 91 being displayed in an enlarged size, when the zoom key 61 is operated again, it is judged that "1" is set in N register, or that the print mode is on, as mentioned above. Thereafter, an enlarging process is effected by coordinate transformation of the displayed area according to the above equations (a) to (d) (step U1→U7→U8→U9):

Specifically, when the zoom key 61 is operated, as shown in FIG. 27, "TA3" is set in TS register as the vertical start coordinate of the image memory 91 for transformation, "$Y_{A5}$" in TE register as the vertical end coordinate, "$Y_{B3}$" in YS register as the horizontal start coordinate, and "$Y_{B5}$" in YE register as the horizontal end coordinate. In this case, as shown at (D) in FIG. 29, the image data enclosed by four coordinates $(T_{A3}, Y_{B3})$ $(T_{A5}, Y_{B3})$ $(T_{A3}, Y_{B5})$ $(T_{A5}, Y_{B5})$ of the image memory 91 is transferred to the entire area of the display memory 81, which stores it, thereby displaying the enlarged image on the liquid-crystal display 52 (steps U9 and U6).

As shown at (C) and (D) in FIG. 29, with part of the enlarged image data stored in the image memory 91 being displayed arbitrarily on the liquid-crystal display section 52, to scroll the screen, the right cursor key 59c is operated, for example. Each time the key is operated, a specific coordinate value of $\alpha$ is added to each of the horizontal start coordinate and end coordinate set in YS register and YE register, respectively, thereby causing the displayed area of the image data transferred from the image memory 91 to the display memory 81 and displayed on the liquid-crystal display section 52 to be updated in the right direction and scrolled at intervals of the specific coordinate value $\alpha$ (step U10→U11, U6).

Additionally, for instance, each time the left cursor key 59d is operated, the specific coordinate value $\alpha$ is subtracted from each of the horizontal start coordinate and end coordinate set in YS register and YE register, respectively, thereby causing the displayed area of the image data transferred from the image memory 91 to the display memory 81 and displayed on the liquid-crystal display section 52 to be updated in the left direction and scrolled at intervals of the specific coordinate value $\alpha$ (step U12→U13, U6).

Furthermore, each time the lower cursor key 59b is operated, the specific coordinate value $\alpha$ is added to each of the vertical start coordinate and end coordinate set in TS register and TE register, respectively, thereby causing the displayed area of the image data transferred from the image memory 91 to the display memory 81 and displayed on the liquid-crystal display section 52 to be updated in the downward direction and scrolled at intervals of the specific coordinate $\alpha$ value (step U14–U15, U6).

Furthermore, for example, each time the upper cursor key 59a is operated, the specific coordinate value $\alpha$ is subtracted from each of the vertical start coordinate and end coordinate set in TS register and TE register, respectively, thereby causing the displayed area of the image data transferred from the image memory 91 to the display memory 81 and displayed on the liquid-crystal display section 52 to be updated in the upward direction and scrolled at intervals of the specific coordinate value $\alpha$ (step U16→U17, U6).

After the enlarged display process according to the operation of the zoom key 61 or the screen scroll process according to the operation of the cursor keys 59a to 59d has been carried out, when the cancel key 57 is operated, control goes back to the initial setting of the displayed area at step U5. After at step U5, "0" is set again in TS register, "A" in TE register, "0" in YS register, and "B" in YE register, the entire area of the image memory 91 is read as display data and transferred to the display memory 81. Thereafter, as shown at (A) in FIG. 29, all of the image data enclosed by four coordinates $(T_0, Y_0)$ $(T_A, Y_0)$ $(T_0, Y_B)$ $(T_A, Y_B)$ in the image memory 91 indicated by the TS, TE, YS, and YE registers, is displayed again on the liquid-crystal display section 52 (step U18→U5, U6).

With "0" set in TS register, "A" in TE register, "0" in YS register, and "B" in YE register, and all of the image data enclosed by four coordinates $(T_0, Y_0)$ $(T_A, Y_0)$ $(T_0, Y_B)$ $(T_A, Y_B)$ in the image memory 91 displayed on the liquid-crystal display section 52 as shown at (A) in FIG. 29, the print key 58 is operated in combination with the 1 key, the image data on the image memory 91 whose vertical coordinates correspond to the range specified by TS register and TE register (in this case, $T_0$ to $T_A$) and whose horizontal coordinates correspond to $Y_0$ to $Y_B$, that is, the image data (in this case, the entire image data) whose vertical coordinates correspond to the displayed range in the liquid-crystal section 52 and whose horizontal coordinates correspond to the entire area of the image memory 91, is transferred as print data to the print data memory 92, which stores it. Thereafter, the thermal head 78 and tape transport motor 84 are driven synchronously via the print control section 83, thereby printing the print data on label tape 72 as shown at (B) in FIG. 29 (step U19→U20).

In this case, the image data transferred to and stored in the display memory 81 has its vertical coordinates fixed at $T_0$ and $T_A$ specified by TS register and TE register and its horizontal coordinates updated one after another in the range between $Y_0$ and $Y_B$. By doing this, the image data corresponding to the entire area of the image memory 91 is scrolled on the liquid-crystal display section 52 from the left end in parallel with the print process at step U20 (step U21).

With "0" set in TS register, "A" in TE register, "0" in YS register, and "B" in YE register, and all of the image data enclosed by four coordinates $(T_0, Y_0)$ $(T_A, Y_0)$ $(T_0, Y_B)$ $(T_A, Y_B)$ in the image memory 91 displayed on the liquid-crystal display section 52 as shown at (A) in FIG. 29, the print key 58 is operated in combination with the 2 key, the image data on the image memory 91 whose vertical coordinates correspond to the range specified by from TS register to TE register (in this case, $T_0$ to $T_A$) and whose horizontal coordinates correspond to the range specified by YS register and YE register (in this case, $Y_0$ to $Y_B$), that is, the image data (in this case, the entire image data) corresponding to the displayed data on the liquid-crystal display section 52, is transferred as print data to the print data memory 92, which stores it. After this, the print data is printed on label tape 72 as shown at (B) in FIG. 29 (step U22→U23).

Regardless of either the print process where only the vertical coordinates are forced to correspond to the displayed areas TS, TE in operating the print key 58 in combination with the 1 key or the print process where both the vertical coordinates and the horizontal coordinates are forced to correspond to the displayed areas TS, TE, YS, YE in operating the print key 58 in combination with the 2 key, the print data transferred to and stored in the print data memory 92 is printed so that its vertical image dot size may correspond to the tape width of label tape 72 stored in the tape width register 93 in the RAM 90. As a result, the image data is printed on the label tape 72 according to the ratio of the size of the display area of the liquid-crystal section 52 to the size of the printed data displayed therein.

With "$T_{A3}$" set in TS register, "$T_{A5}$" in TE register, "$Y_{B3}$" in YS register, and "$Y_{B5}$" in YE register, and the image data enclosed by four coordinates $(T_{A3}, Y_{B3})$ $(T_{A5}, Y_{B3})$ $(T_{A3}, Y_{B5})$ $(T_{A5}, Y_{B5})$ in the image memory 91 enlarged and displayed on the liquid-crystal display section 52 by the enlarged display process according to the operation of the zoom key 61 as shown at (D) in FIG. 29, the print key 58 is operated in combination with the 1 key, the image data on the image memory 91 whose vertical coordinates correspond to the range specified by TS register and TE register (in this case, $T_{A3}$ to $T_{A5}$) and whose horizontal coordinates correspond to $Y_0$ to $Y_B$, that is, the image data whose vertical coordinates correspond to the displayed range in the liquid-crystal section 52 and whose horizontal coordinates correspond to the entire area of the image memory 91, is transferred as print data to the print data memory 92, which stores it. After this, the print data is printed on the label tape 72 as shown at (E) in FIG. 29 (step U19→U20).

In this case, the image data transferred to and stored in the display memory 81 has its vertical coordinates fixed at $T_{A3}$ and $T_{A5}$ specified by TS register and TE register and its horizontal coordinates updated one after another in the range between $Y_0$ and $Y_B$. By doing this, the enlarged image data to be printed on label tape 72 is scrolled on the liquid-crystal display section 52 from the left end, in parallel with the print process at step U20 (step U21).

With "$T_{A3}$" set in TS register, "$T_{A5}$" in TE register, "$Y_{B3}$" in YS register, and "$Y_{B5}$" in YE register, and the image data enclosed by four coordinates $(T_{A3}, Y_{B3})$ $(T_{A5}, Y_{B3})$ $(T_{A3}, Y_{B5})$ $(T_{A5}, Y_{B5})$ in the image memory 91 enlarged and displayed on the liquid-crystal display section 52 by the enlarged display process according to the operation of the zoom key 61 as shown at (D) in FIG. 29, the print key 58 is operated in combination with the 2 key, the image data on the image memory 91 whose vertical coordinates correspond to the range specified by TS register and TE register (in this case, $T_{A3}$ to $T_{A5}$) and whose horizontal coordinates correspond to the range specified by YS register and YE register (in this case, $Y_{B3}$ to $Y_{B5}$), that is, only the image data corresponding to the display data on the liquid-crystal display section 52, is transferred as print data to the print data memory 92, which stores it. After this, the print data is printed on the label tape 72 as shown at (F) in FIG. 29 (step U22→U23).

Therefore, with the label printer of the above-mentioned configuration, for example, after the image data of a manuscript 64 photographed by the CCD camera 62 is supplied to the printer body 50 in the image input data input mode, all of the entered image data is displayed in the print mode. In this state, when the zoom key 61 is operated, the data is enlarged gradually in the display area of the liquid-crystal display section 52. With the entered image data displayed in a given size, when the print key 58 is operated in combination with the 1 key, the print data across the label tape 72 is printed according to the ratio of the image data displayed on the liquid-crystal display section 52 to the display section in the vertical direction, whereas the print data along the tape is printed according to all of the entered image data items. Furthermore, when the print key 58 is operated in combination with the 2 key, only the image data displayed on the liquid-crystal display section is printed according to its size ratio. As a result, with the label printer, in all cases, the image data printed on label tape 72 is printed according to the ratio of the size of the display area in the liquid-crystal display section to the size of the image data displayed therein.

Therefore, particularly when the image data to be printed is enlarged and displayed, it can be known exactly in advance from the displayed state how large the image data to be printed will be printed on label tape 72.

Figure 30:
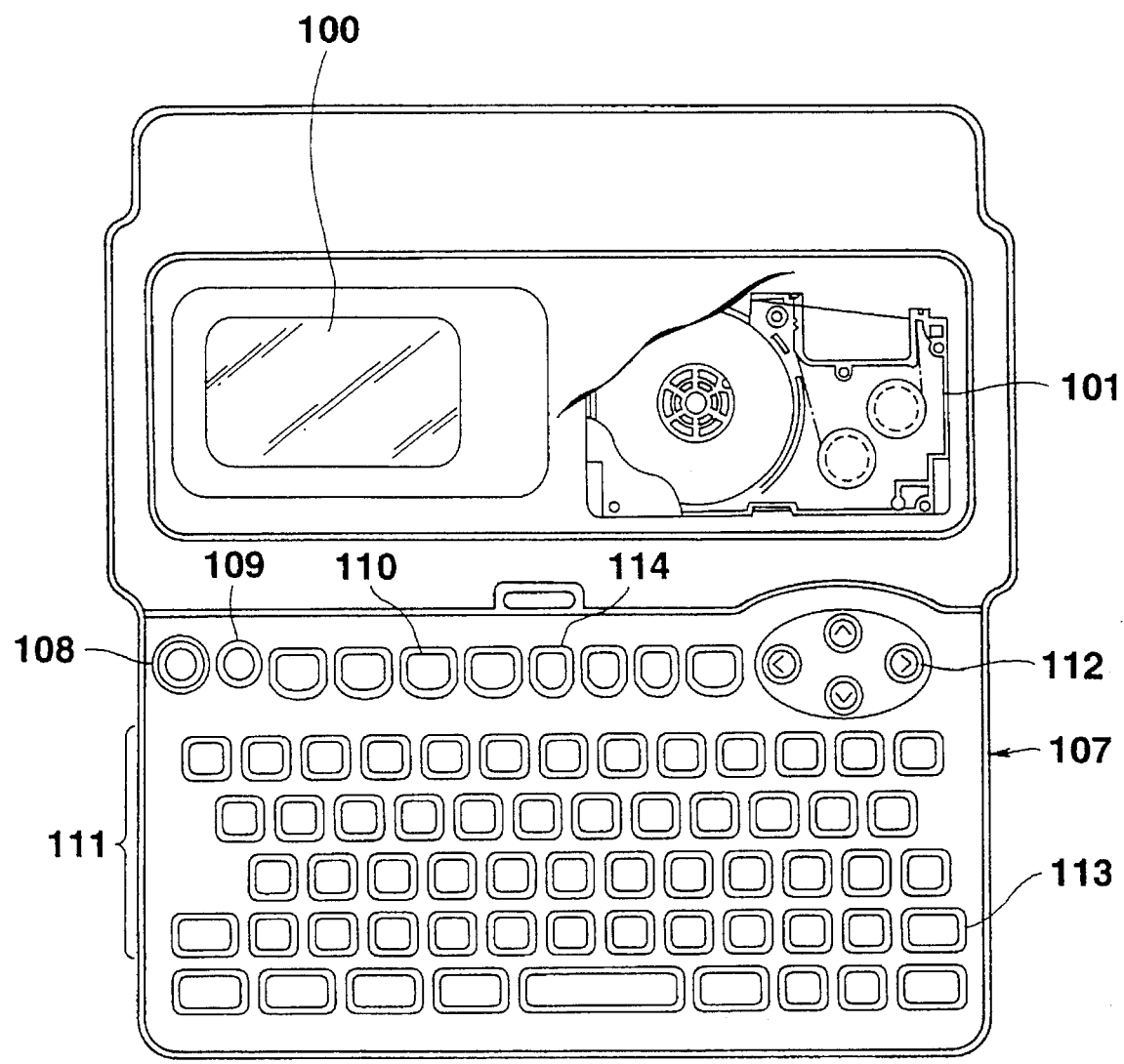
FIG. 30 is an outer view of a label printer according to a sixth embodiment of the present invention.
Figure 31:
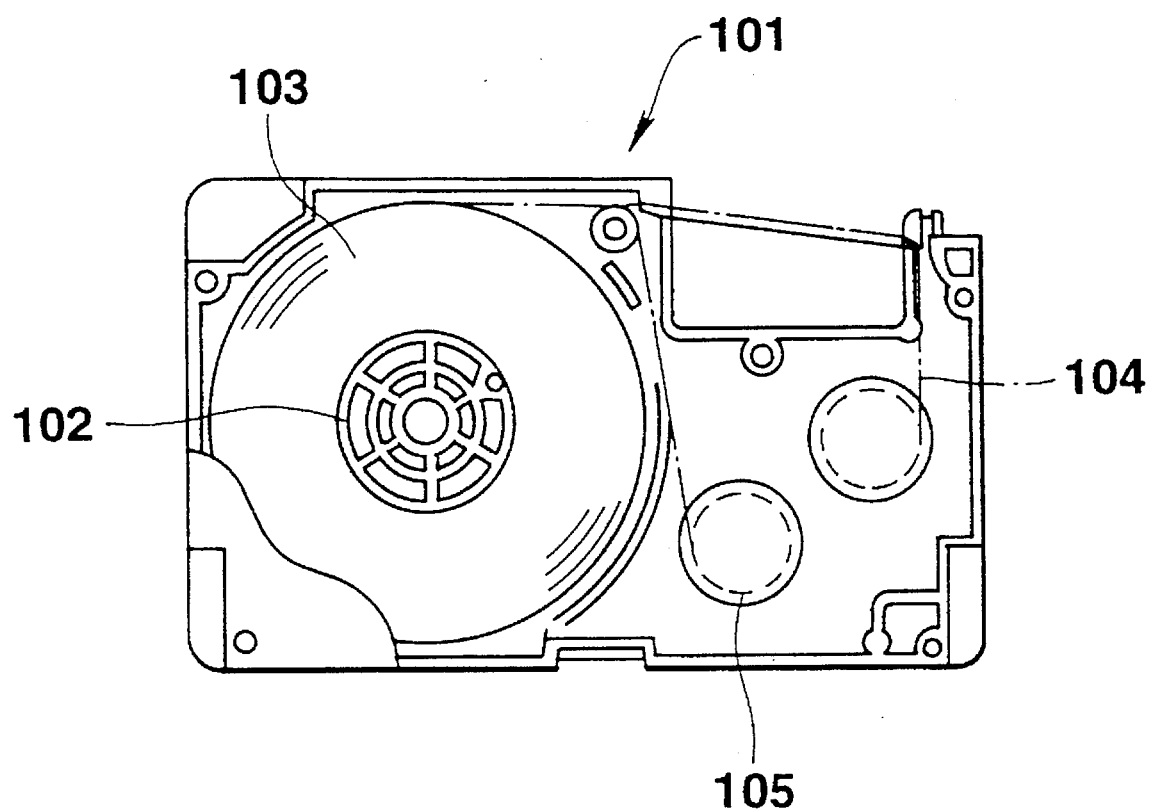
FIG. 31 shows the structure of the tape cartridge in the label printer according to the sixth embodiment of the present invention.

Hereinafter, referring to the drawings, a label printer according to a sixth embodiment of the present invention will be explained. FIG. 30 is an outer view of a label printer of the sixth embodiment. In the figure, on the upper front of the label printer, a liquid-crystal display section 100 for displaying the entered characters is provided. An ink tape cassette 101 is housed in a printing unit to the right of the liquid-crystal display section 100. The ink tape cassette 101 has a structure as shown in FIG. 31, where adhesive-sheet-stuck label tape 103 is wound around a tape core 102. An ink ribbon 104 is fed via a roller 105, interlocking with the label tape 103. Then, a head (not shown) prints characters on the label tape 103.

In FIG. 30, a key input section 107 is provided in the middle of the front of the label printer. The key input section 107 is provided with on and off keys 108 and 109 for turning the power on and off, a font setting key 110 for selecting a font and a font size, character keys 111 for entering alphabets and numerals, up and down and right and left cursor keys 112 for moving the cursor upward, downward, rightward, and leftward, a return key 113, and an image display key 114 for displaying the created sentence in the form of an image to be printed.

Figure 32:
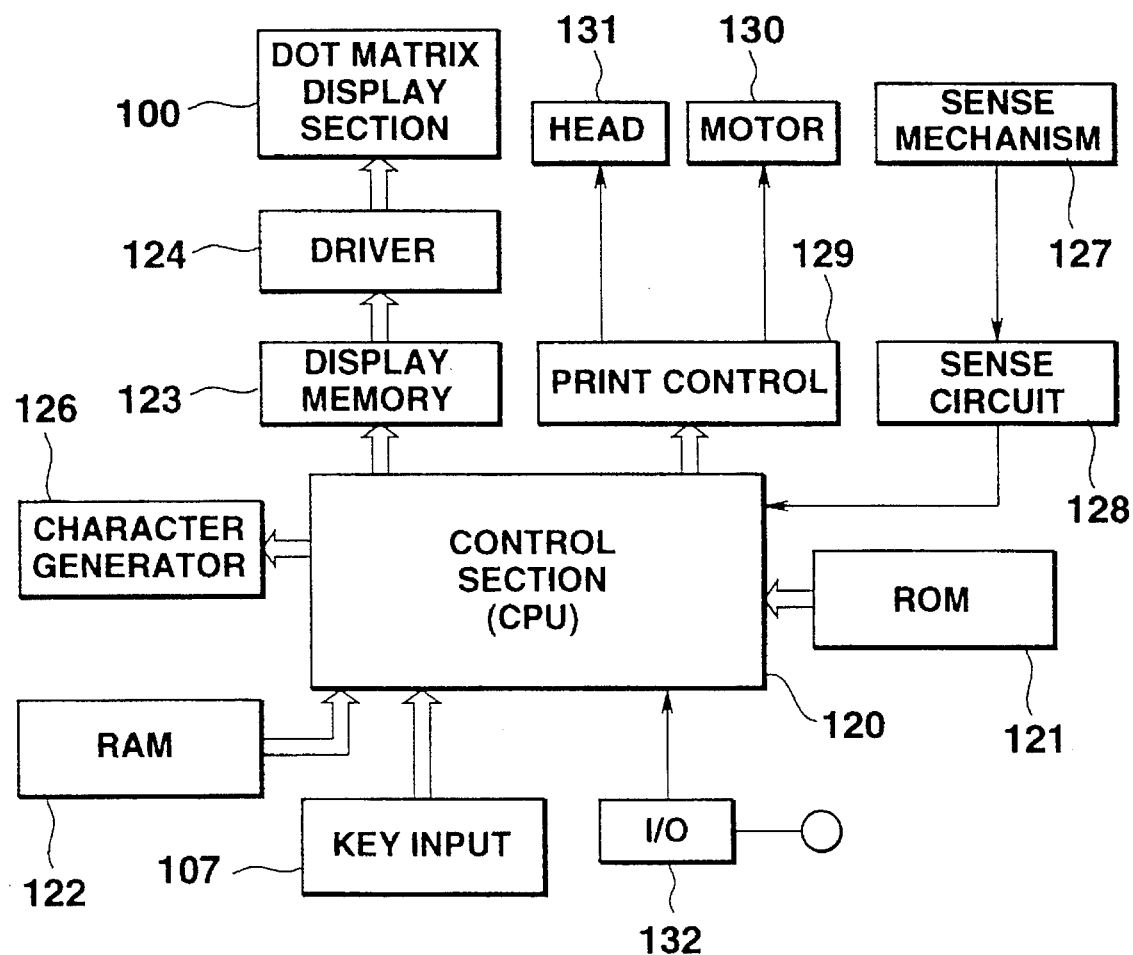
FIG. 32 is a block diagram of the electronic circuitry of the label printer according to the sixth embodiment of the present invention.

A circuit configuration of the label printer will be explained with reference to FIG. 32. A control section 120 is a central processing section for controlling the operation of each circuit. It performs processes according to the control program stored in a ROM 121, including the process of storing character codes entered from the key input section 107 in a RAM 122. In the data setting mode, the control section 120 transfers the character code data stored in a RAM 122 to a display memory 123, actuates a driver 124, and displays the created sentence on a dot matrix liquid-crystal display section 100.

Furthermore, when an image display key 114 is operated, the control section 120 reads the print data on the specified font from a character generator 126, and develops the read-out print data in the RAM 122 on the basis of the format data. Then, it transfers the developed data to the display memory 123, and displays it on a liquid-crystal display section 100 via a driver 124.

A tape width sensing mechanism 127 senses the tape width of a tape cartridge 101 set in the label printer. The sense result of the tape width sensing mechanism 127 is converted into an electronic signal at a sensing circuit 128, which supplies the signal to the control section 120. The control section 120 judges whether or not the created sentence can be printed on the label tape 103 set in the label printer, on the basis of the signal indicating the tape width outputted from the sensing circuit 128 and the setting factors for the created sentence, including the number of lines and the size of characters in each line.

A print control section 129 drives a motor 130 and a head 131 on the basis of the print data outputted from the control section 120, thereby printing characters on label tape. An I/O interface section 132 is an interface circuit for exchanging data with an external unit such as a word processor or an electronic notebook.

Figure 33:
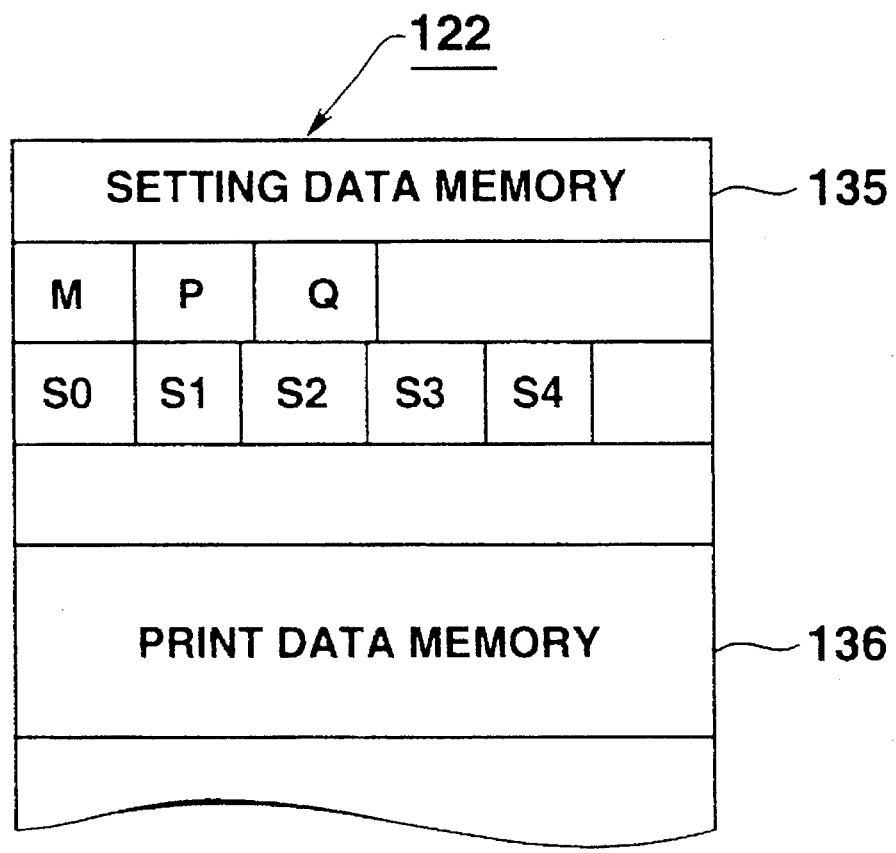
FIG. 33 shows the structure of the RAM provided in the electronic circuitry of the label printer according to the sixth embodiment of the present invention.

Referring to FIG. 33, the structure of the RAM 122 will be explained. The RAM 122 contains a setting data memory 135 for storing character codes and others entered from the key input section 107, a mode register M for storing the values corresponding to operation modes, a P register for storing the tape width sensed at the tape width sensing mechanism, and a Q register for storing the number of lines of the created sentence.

For instance, in the mode register M, M=0 is stored in the data setting mode, and M =1 is set in the print mode.

The RAM 122 also contains registers S0, S1, S2, S3, and S4 for storing the size of characters from the first to the fifth line, and a print data memory 136 for storing the dot data obtained by developing the data stored in the setting data memory 135 for display on the liquid-crystal display section 100, on the basis of the size of characters specified by the format data stored in each register, the number of lines, etc.

Hereinafter, the operation of the embodiment of the above structure will be described with reference to the flowchart of FIG. 34. It is assumed that the setting mode is at M=0.

Figure 34:
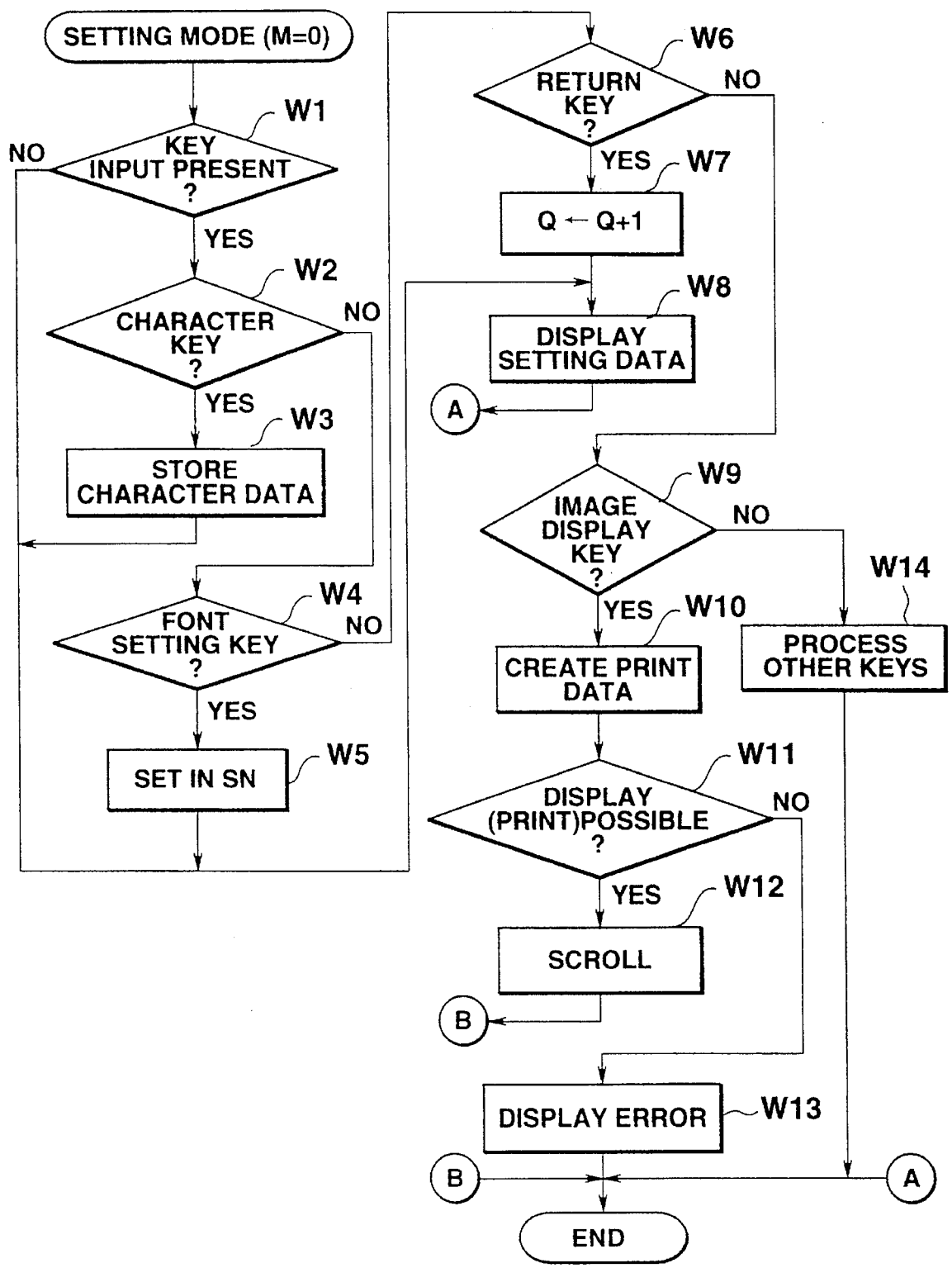
FIG. 34 is a flowchart of the operation in the setting mode of the label printer according to the sixth embodiment of the present invention.

At step W1 of FIG. 34, it is judged whether or not any key has been pressed. If some key has been pressed, at the next step W2, it is judged whether or not any character key 111 has been pressed. If it is found at step W2 that a character key 111 has been pressed, at the next step W3, the character code corresponding to the pressed character key 111 is stored in the setting data memory 135.

If it is found at step W2 that a key other than the character keys 111 has been pressed, control proceeds to step W4, where it is judged whether or not the font setting key 110 has been pressed. If it is found at step W4 that the font setting key has been pressed, at the next step W5, the current number of lines is determined from the value in the register Q, and the size of the font is set in the register SN (N: 0 to 4) for the corresponding line.

If it is found at step W4 that what is pressed is not the font setting key 110, control goes to step W6, where it is judged whether or not the return (new line) key 113 has been pressed. If it is found at step W6 that the return key 113 has been pressed, at the next step W7, the value of register Q storing the number of entered lines is incremented by 1. Then, at the next step W8, the setting data entered from the key input section 107 and stored in the setting data memory 135 is displayed on the liquid-crystal display section 100.

Examples of displaying setting data items in the data setting mode will be described with reference to (A) to (C) in FIG. 35. There is shown at (A) in FIG. 35 the display state when 6 mm is specified for the height of characters in the first line by pressing the font setting key 110, and alphabets "A, B, C, D" are entered by pressing the character keys 111, with a 9-mm-wide tape cartridge in use. In this case, in the upper portion of the liquid-crystal display section 100, the entered alphabets "A, B, C, D" are displayed, and in the lower portion, the tape width of "9 mm" sensed at the tape width sensing mechanism 127, the number of lines "1", and the height of characters "6 mm" set from the font setting key 110 are displayed. After alphabets "E, F" are entered, pressing the return key 113 causes a new line mark indicating the end of the line to appear as shown at (B) in FIG. 35.

After the return key 113 has been pressed, when the font setting key 110 is pressed to specify 2 mm for the height of characters in the second line, the number of lines "2" and the height of characters "2 mm" are displayed in the lower portion of the liquid-crystal display section 100 as shown at (C) in FIG. 35.

In FIG. 34, if it is found at step W6 that what has been pressed is not the return key 113, control proceeds to step W9, where it is judged whether or not the image display key 114 has been pressed. If it is found at step W9 that the image display key 114 has been pressed, control goes to the next step W10, where print data is created. To create print data, the character pattern data corresponding to the character code stored in the setting data memory 135 is read from the character generator 126. The read-out character pattern data is developed on the basis of the size of characters in each line stored in register SN, and the results are stored in the print data memory 136.

Then, at the next step W11, on the basis of the tape width stored in register P, the number of lines stored in register Q, and the size of characters in each line stored in register SN, it is judged whether or not the entered data can be printed under the conditions set in the individual registers. If printing can be effected, at the next step W12, the print data items stored in the print data memory 136 are supplied in sequence to the liquid-crystal display section 100, which scrolls them, for example.

This causes the created sentences to be scrolled in print image form (in the form to be printed) from left to right sequentially.

Using FIG. 36, a display when the image display key 114 has been pressed will be described. There are shown at (A) and (B) in FIG. 36 display states under the conditions of FIG. 35, or when the image display key 114 is pressed after sentences have been created with the height of characters in the first line being 6 mm and that in the second line being 2 mm.

In this case, as shown at (A) in FIG. 36, alphabets "A, B, C, D" are displayed on the first line in a 6-mm-high character size and alphabets "G, H, I, J" are displayed on the second line in a 2-mm-high character size.

Then, as shown at (B) in FIG. 36, characters "E, F" following the alphabets "C, D" in the created sentence are displayed on the first line in a 6-mm-high character size and alphabets "K, L" following the alphabets "I, J" are displayed on the second line in a 2-mm-high character size.

FIG. 37 shows a state when the created sentences are actually printed on label tape. Comparison of FIG. 36 with FIG. 37 shows that the actual print state of FIG. 37 can be confirmed from the image display of FIG. 36.

Because pressing the image display key 114 enables the created sentences to be displayed beforehand in the form of images actually printed, it is possible to do editing work including change of character sizes, while looking at the displayed images. This prevents a failure due to the difference between the displayed image and the print image. Because it is not necessary to print the created sentence on label tape for verification, this saves the label tape and makes the verify operation simpler. Especially in the case of a compact printing unit whose display section is so small that all of the sentences cannot displayed at a time, scrolling the print image enables the user to verify the print image of all the sentences.

In FIG. 34, if it is judged at step W11 that printing cannot be effected under the conditions currently set, control goes to step W13, where an error message is displayed. If it is found at step W9 that what has been pressed is not the image display key 114, control proceeds to step W14, where another key process is executed.

While in the embodiment, the sentences are automatically scrolled without any key operation during the image display, they may be scrolled sequentially each time the image display key 114 is pressed. The present invention is not limited to the label printer described in the embodiments, but may be applied to other types of printing equipment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A printing apparatus comprising:

input means for inputting print data including characters;

number-of-lines detecting means for detecting a number of lines of the print data input by said input means;

size detecting means for detecting a size of a printing medium on which the print data is to be printed;

determining means for determining a line length for each line of the print data input by said input means;

calculation means for calculating a ratio of a maximum line length of the print data which is determined by said determining means to a minimum line length thereof;

print data forming means including:

means for determining sizes of characters of the lines respectively corresponding to the maximum line length and the minimum line length in accordance with the ratio obtained by said calculation means so that the lines corresponding to the maximum line length and the minimum line length are printed in an adjacent length; and means for forming dot pattern data from the print data in accordance with the sizes of the characters; and printing means for printing a dot pattern corresponding to the dot pattern data formed from the print data by said print data forming means, on said printing medium.

2. A printing apparatus according to claim 1, wherein:

said printing medium comprises a printing tape; and said size detecting means includes means for detecting a width of the printing tape.

3. A printing apparatus according to claim 1, wherein said printing medium comprises a label tape.

* * * * *